United States Patent
Johnson

[19]

[11] Patent Number: 6,122,345
[45] Date of Patent: Sep. 19, 2000

[54] SYSTEM AND METHOD FOR DEVELOPING AND PROCESSING AUTOMATIC RESPONSE UNIT (ARU) SERVICES

[75] Inventor: William J. Johnson, Flower Mound, Tex.

[73] Assignee: MCI WorldCom, Inc., Clinton, Miss.

[21] Appl. No.: 08/861,156

[22] Filed: May 21, 1997

Related U.S. Application Data

[60] Provisional application No. 60/031,099, Jun. 25, 1996.

[51] Int. Cl.[7] .................................................. H04M 1/64
[52] U.S. Cl. .................. 379/67.1; 379/88.23; 379/93.17
[58] Field of Search .............................. 379/67.1, 88.16, 379/88.22, 88.23, 88.24, 88.25, 88.27, 102.02, 93.17, 201

[56] References Cited

U.S. PATENT DOCUMENTS

| | | | |
|---|---|---|---|
| 4,625,081 | 11/1986 | Lotito et al. ............................... | 379/88 |
| 4,747,127 | 5/1988 | Hansen et al. ............................ | 379/94 |
| 5,255,305 | 10/1993 | Sattar ...................................... | 379/201 |
| 5,488,569 | 1/1996 | Kaplan et al. ....................... | 364/514 R |
| 5,488,650 | 1/1996 | Greco et al. ............................. | 379/201 |
| 5,555,288 | 9/1996 | Wilson et al. ............................. | 379/67 |
| 5,588,044 | 12/1996 | Lofgren et al. ............................ | 379/67 |
| 5,640,319 | 6/1997 | Beuning et al. ......................... | 379/219 |

*Primary Examiner*—Fan S. Tsang

[57] ABSTRACT

A system and method for facilitating the design and development of automatic response unit (ARU) services and for processing automated response unit (ARU) services. The present invention comprises a compiler and interpreter that facilitate the development of an ARU service encoding. The interpreter is one embodiment of the present invention that may be used for processing an ARU service encoding. The present invention further comprises a graphical user interface (GUI) tool for creating and maintaining an ARU service encoding. An ARU service encoding is a tree structure comprised of service nodes wherein each service node may represent a caller's menu selection from the ARU service. Each service node has multiple components including variable support, message capability, processing capability, and default capability. The present invention parses the ARU service encoding for service nodes. For each service node, the present invention processes node variables, prefunction messages, automated input, prefunction interactions, functions, postfunction interactions, and postfunction messages.

14 Claims, 28 Drawing Sheets

SYSTEM AND METHOD FOR DEVELOPING AND PROCESSING AUTOMATIC RESPONSE UNIT (ARU) SERVICES

This application claims the benefit of U.S. provisional application Ser. No. 60/031,099 filed Jun. 25, 1996.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

This invention relates to computer compilers and interpreters, and more particularly to a compiler and interpreter that facilitates the design and development of automatic response unit (ARU) services.

2. Related Art

Automatic response unit (ARU) services provide users with automated telephone interfaces that deliver options and information. For example, 1-800-MUSICNOW is an ARU service that allows customers to listen to music, select music for ordering, and place orders. Other ARU services include but are not limited to, dating services, stock quote/management services, and health care services.

To use an ARU service, a customer dials a telephone number which connects to an ARU. The ARU plays a recorded message listing a menu of options. The customer invokes a menu selection by pressing a number on a touchtone telephone. The menu selection may either provide a selected service to the customer, or may provide another menu of options. The customer traverses the different menus until his or her service requests are complete.

The conventional process for developing a new ARU service is to use existing source code as a starting point for the new service and then tailor it to meet the needs of the new service. The current method is to develop code on a case-by-case basis without following standard procedures for the reuse of existing ARU source code including code for menus, menu options, and recorded messages.

A disadvantage of developing an ARU service using conventional development techniques is that there is no architecture for multiple executing ARU services to reuse and share executable source code, menu options, and recorded messages at run time. The reuse of existing ARU source code must be provided without over-generalizing an ARU service to the point of poor performance. The reuse of tested source code and service objects also allows for the quick debugging of new services.

Another disadvantage pertains to minimizing development time of new ARU services and maximizing performance. Because conventional development techniques do not take full advantage of reusing existing source code, the development time for a new ARU service is increased. In addition, to maximize performance of a new ARU service, the developer must minimize storage of executable source code, menu options, and recorded messages.

Therefore, there is a need for a system and method of streamlining the development of new quality ARU services.

SUMMARY OF THE INVENTION

The present invention provides a compiler and interpreter that facilitates the design and development of automatic response unit (ARU) services through a reuse architecture. In one embodiment of the present invention, a developer, such as a programmer, of a new ARU service encodes the ARU service using a source code-like programming language. The compiler and interpreter of the present invention inputs the ARU service encoding and translates it into an executable ARU service.

The compiler and interpreter of the present invention handles ARU service processing that is common across ARU services. Therefore, a developer includes only the customized processing of an ARU service in the ARU service encoding. Partitioning common and customized processing allows new ARU services to reuse existing ARU service processing and source code, thereby eliminating development time and efficiently utilizing network storage.

The present invention also provides a graphical user interface (GUI) tool to conveniently create and maintain an ARU service encoding. Therefore, a developer, such as a non-programmer, of an ARU service can create the ARU service without manually writing an ARU service encoding (using GUI tool).

In addition to a system and method for developing an ARU service, the present invention provides a system and method for processing an ARU service. The system and method for processing an ARU service uses an ARU service encoding that is translated, in one embodiment by an interpreter, to an executable ARU service. The present invention defines an ARU service as a tree structure comprised of service nodes. Each service node has multiple components including variable support, message capability, processing capability, and default capability. A caller may traverse a tree structure for an ARU service using in one embodiment an interpreter translating menu selections. As a caller traverses a tree structure for an ARU service the present invention processes the components of each visited service node.

While the present invention uses the term "ARU services", it should be understood that 800 call processing plans, automatic call distributor (ACD) implementations, switch or signal call processing, and the like, are also developed using the present invention. The term "ARU services" is used in its broadest interpretation.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 1:
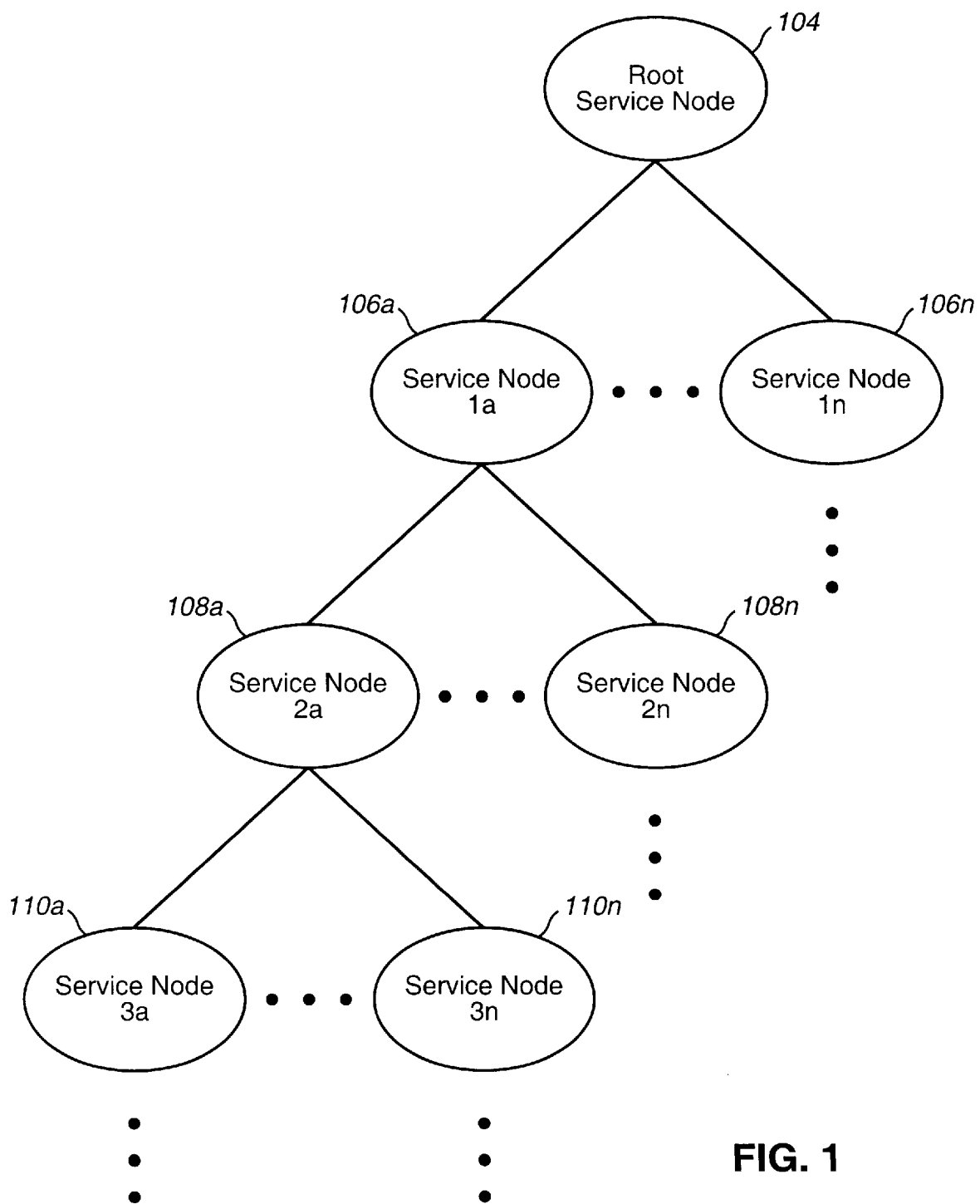
FIG. 1 is a block diagram illustrating a preferred embodiment of an ARU service offering.

1. Overview of the preferred embodiment of the present invention

The present invention provides a system and method for developing automatic response unit (ARU) services. The preferred embodiment of the present invention is a compiler or interpreter that processes an ARU service encoding. An ARU service encoding is an abstract representation of an ARU service in a source code type language. A compiler or interpreter inputs the ARU service encoding and processes it accordingly, thereby generating an executable ARU service.

The present invention also provides an ARU service encoding that is translated to an executable ARU service, in one embodiment by an interpreter. The embodiment of the ARU service encoding of the present invention, discussed herein, is further described in backus naur form (BNF) which is a well known standard for source code grammar in Appendix A. Appendix A forms a part of this application and is self-explanatory. It would be apparent to one skilled in the relevant art to develop alternative embodiments for an ARU service encoding comprising a different grammar.

With regards to the system and method for developing ARU services of the present invention, one embodiment that is used to develop ARU services is a compiler. The compiler embodiment of the present invention comprises a compiler and linker embodiment and is a two pass mechanism. The first pass internalizes the ARU service encoding into conveniently managed data structures with atoms (e.g. input definitions, messages, functions, variable assignments, etc.) elaborated and prepared into a quickly accessed and executed internalized form (e.g. in processor memory). The second pass is a telephone call handler that uses the internalized form to process a call.

An example embodiment of an internalized form of an ARU service encoding as used by a compiler embodiment is further described in Appendix B. Appendix B forms a part of this application and is self-explanatory. Appendix A and Appendix B together provide the recipe for a software developer to develop the compiler and/or interpreter of the present invention. It would be apparent to one skilled in the relevant art to develop alternative embodiments for an internalized form of an ARU service encoding for use by alternative compiler embodiments.

There are two ways in which a developer may encode an ARU service offering. First, a developer, such as a programmer, may use an ARU source code language, such as one implied by the BNF grammar in Appendix A, and write an ARU service encoding, or program. The developer then submits the ARU service encoding to a compiler or interpreter that translates the ARU source code language to an executable ARU service. Second, a developer, such as a non-programmer, may use a graphical user interface (GUI) tool to create an ARU service. The GUI tool translates a graphical representation of the ARU service to corresponding ARU source code language constructs which can be compiled or interpreted.

With regards to the system and method for processing ARU services of the present invention, the ARU service encoding is processed, in one embodiment by an interpreter, when a caller places a telephone call. In other words, the code that is developed by either writing a source code which is compiled or interpreted or using a GUI tool is processed when a customer places a telephone call. When a telephone call is routed to an ARU, the ARU service encoding is processed. As will be described in more detail herein, processing the ARU service encoding involves playing messages to a caller, receiving input from the caller, processing the caller's input, and connecting the call or providing the caller with additional options based on the result of the processing. As mentioned previously, in one embodiment of the present invention, an interpreter translates the ARU service encoding to provide the caller information and receive and process the caller's input.

FIG. 1 is a block diagram illustrating a preferred embodiment of an ARU service offering 102. An ARU service offering 102 is an hierarchy of an ARU service that typically depicts the menu selections available to a caller. The preferred embodiment of an ARU service offering 102 is a tree structure in which each node of the tree represents a service node object. The top-most node is called the root service node 104. Each node may have a variable number of descendant nodes. For example, in FIG. 1, the root service node 104 has descendant service node 1a 106a through descendant service node 1n 106n. Service node 1a 106a has descendant service node 2a 108a through service node 2n 108*n*, and service node 2*a* 108*a* has descendant service node 3*a* 110*a* through descendant service node 3*n* 110*n*. Each service node object comprises eight (8) optional components that are described in greater detail below. The use of interaction method constructs (or objects) defines branches and hierarchy of the tree structure. Interaction method constructs are specified in the prefunction interactions 208 and/or the postfunction interactions 216 components of a service node.

In typical operation, the tree structure of an ARU service offering 102 is traversed according to a caller's menu selections. For example, the caller enters the ARU service offering 102 at the root service node 104. The ARU service offering 102 provides the caller with the available menu selections from which the caller selects one. The ARU service offering 102 proceeds to a next service node 106*a*–106*n* corresponding to the caller's menu selection. The ARU service offering 102 then presents the caller with a new set of menu selections as provided by the new service node 106*a*–106*n*. The tree structure of the ARU service offering 102 may be traversed in both a descending and ascending manner; that is, a caller's menu selection at a specific service node may jump the caller to a descending service node or to an ascending service node. If a caller is located at the root service node 104, the caller can only traverse descending service nodes, and if the caller is located at a leaf service node, a service node with no descendants, the caller can only jump to ascending service nodes. A caller traverses the ARU service offering 102 until all service requests have been completed.

Figure 2:
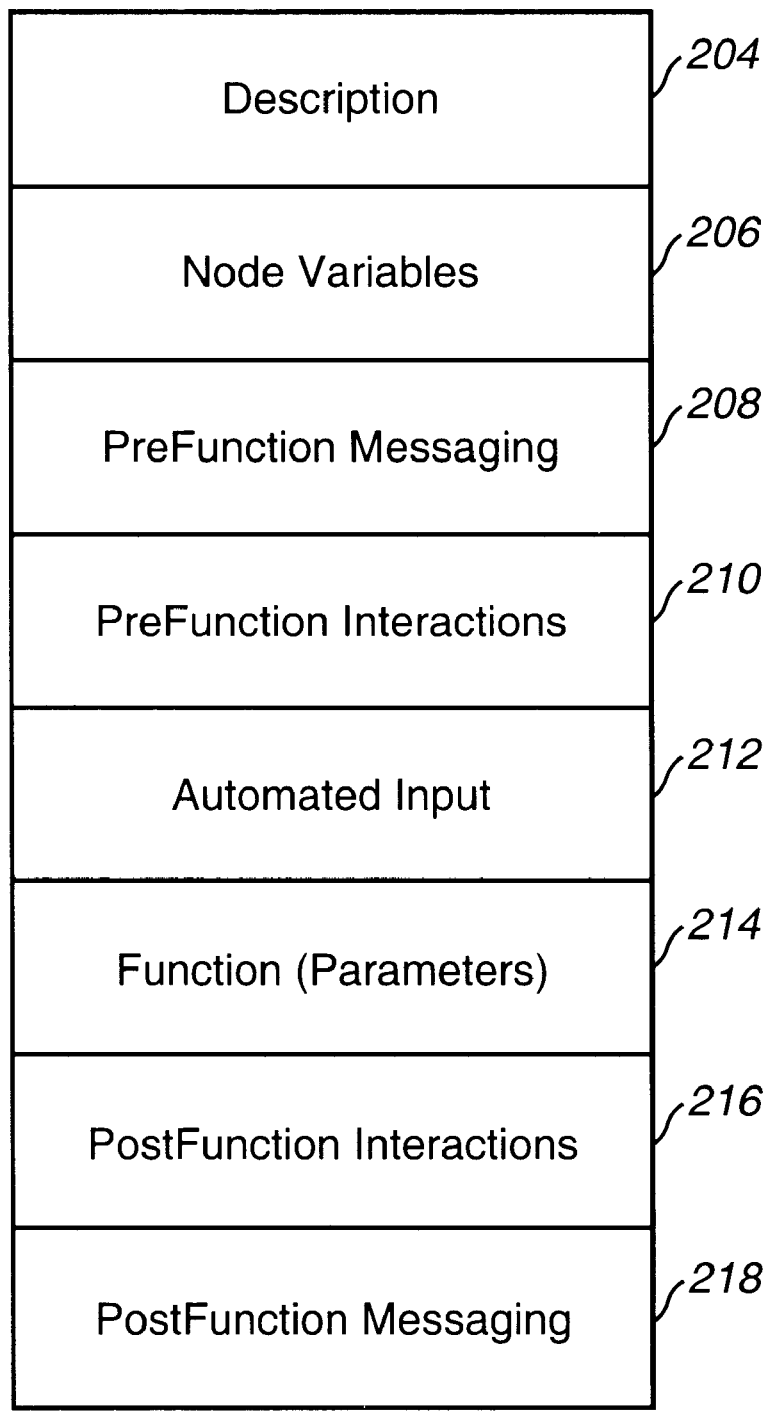
FIG. 2 is a block diagram illustrating the components of a service node object.

FIG. 2 is a block diagram illustrating the optional (may be specified as null) components of a service node object 202. The components of a service node object include: description 204, node variables 206, prefunction messaging 208, prefunction interactions 210, automated input 212, function 214, postfunction interactions 216, and postfunction messaging 218. The description 204 component is a comment field in which a developer may insert text describing the corresponding service node of an ARU service offering, analogous to a programming language source code comment.

The node variables 206 component contains developer defined variables that are accessible to the corresponding service node and to all descending service nodes. Node variables comprise a list of variable objects that defines variables. An example of a list of variable objects is as follows:

Variable object 1
Variable object 2
. . .
Variable object n

Each variable object is defined as any one of the following variable types: integer, real number, character string, generic data (e.g. binary or hexadecimal), input data object, message object, interaction method object, or service node object. The following variable object types including input data object, message object, interaction method object and service node object may reference a component of the ARU service encoding and are described in greater detail below. For example, an entire service node may be specified by referencing a service node type variable. The description of node variables in these terms is for convenience purpose only. It would be readily apparent to one skilled in the relevant art to implement alternative node variables.

The prefunction messaging 208 and prefunction interactions 210 components provide pre-function processing (i.e., before processing function 214 component of service node object). More specifically, the ARU service offering 102 processes these two components prior to processing the functions 214 component when processing a particular service node. The prefunction messaging 208 component provides a customer with menu selections or prompt information. Therefore, when a customer reaches a service node, the ARU service offering 102 plays the prefunction message information to the customer before performing any other service node action.

The prefunction messaging 208 component is an ordered list of message objects. Each message object is processed in order to the caller. A message object may specify a service outgoing message, instruction menu, prompt message, exit/salutation message, or the like. Each message object type is defined as one of the following:

(i) fully qualified path name of a recording file (e.g. voice recording);
(ii) text string for annunciation;
(iii) memory address of a recording or text string for annunciation;
(iv) variable reference; and
(v) message table entry handle.

A message table entry handle references a single table that is maintained separately and referenced by all of the service nodes of an ARU service offering 102. A message table allows a service node to reference existing message objects at runtime. This feature of the present invention facilitates reuse of ARU service encodings, sharing of messages, and eliminates redundant message storage for a plurality of ARU service offerings 102 at run time. The preferred embodiment of a message table is sorted on handle to facilitate efficient searching. An example embodiment of a message table which contains entries referenced by a message table entry handle is as follows:

| HANDLE | MESSAGE | DESCRIPTION |
| --- | --- | --- |
| 345987 | Message 1 | Optional description text |
| 345988 | Message 2 | Optional description text |
| . . . | . . . | . . . |
| 545486 | Message n | Optional description text |

It would be readily apparent to one skilled in the relevant art to implement an alternate message table.

The prefunction interactions 210 component provides the rules for determining which service node the caller wants to traverse to. That is, the ARU service offering 102 receives the caller's response or input to the prefunction message and performs the corresponding function. More specifically, a prefunction interactions 210 component comprises a list of interaction method objects. Each interaction method object specifies a rule to perform specific processing. A rule consists of a condition and a mapped action. When the condition is satisfied (for example, based on a caller's telephone keypad response to a message played), the mapped action is performed. The action may be a jump to a service node, a function call within the particular node, or a message to be played which is defined within the particular node. An interaction method may be also specified with a variable reference.

The following conditions are valid for interaction methods defined in a prefunction interactions 210 component:

(i) Otherwise condition (i.e. do this interaction method if no other conditions are satisfied);
(ii) Ignore others condition (i.e. do unconditionally and ignore other interaction methods);

(iii) Do first condition (i.e. do unconditionally and then consider other interaction methods);

(iv) Do last condition (i.e. do unconditionally after processing all other interaction methods);

(v) Input data object (for explicit anticipated input);

(vi) Integer representing finite number of entered characters (e.g. 21=A, 22=B, . . .);

(vii) Integer representing finite number of entered numerics;

(viii) Delimiter which delimits character data of an unspecified length;

(ix) Delimiter which delimits numeric data of an unspecified length; and (x) String with leading 2 byte delimiter with is used to compare to voice detected input (e.g. delimiter=0 implies a pause).

Different interaction methods may specify the same condition in order to perform different actions based on that condition. The order of interaction method objects specified in the prefunction interactions 210 component specifies the order of processing by default. An exception to the order of processing is the occurrence of a node-jump directive. A node-jump directive results in the caller jumping to another service node in the ARU service offering 102. A node-jump directive is always the last interactive method processed during the current service node processing. However, a node-jump directive may specify to jump to a component in the current service node, which specified the node-jump directive (i.e., not necessarily a different service node).

An interaction method may be specified also as a table entry handle in an interaction method table. An interaction method table is a single table that is maintained separately and referenced by all of the service nodes of an ARU service offering 102. An interaction method table allows a service node to reference existing interaction method objects at run time. This feature of the present invention facilitates reuse of ARU service encodings, sharing of interaction methods for new ARU service offerings 102, and eliminates redundant interaction method storage for a plurality of ARU service offerings 102. The preferred embodiment of an interaction method table is sorted on handle to facilitate efficient searching. An example embodiment of an interaction method table is as follows:

| HANDLE | INTERACTION METHOD | DESCRIPTION |
| --- | --- | --- |
| 625934 | Interaction Method 1 | Optional description text |
| 625935 | Interaction Method 2 | Optional description text |
| ... | ... | ... |
| 765477 | Interaction Method n | Optional description text |

It would be readily apparent to one skilled in the relevant art to implement an alternate interaction method table.

The automated input 212 component of a service node object contains default input values that the service node uses in the same way as values entered by the caller. This component allows for automated testing of service node behavior. More specifically, the automated input 212 component comprises an input data object that is a test data value. The test data value may be any value that can be entered into the ARU service offering 102 by a caller. An input data object is defined as any one of the following types:

(i) dual tone multi-frequency (DTMF) sequence as back to back single-byte data stream numerics;

(ii) text string as back to back double-byte character representations;

(iii) fully qualified path name of a recording file (e.g. voice recording);

(iv) memory address of a DTMF sequence, text string, or recording;

(v) variable reference; and (vi) input table entry handle.

An input table entry handle references a single table that is maintained separately and referenced by all of the service nodes of an ARU service offering 102. An input table allows a service node to reference existing input data objects at runtime. This feature of the present invention facilitates reuse of ARU service encodings, sharing of input values for new ARU service offerings 102, and eliminates redundant input constant storage for a plurality of ARU service offerings 102 at run time. The preferred embodiment of an input table is sorted on handle to facilitate efficient searching. An example embodiment of an input table which contains entries referenced by an input table entry handle is as follows:

| HANDLE | INPUT | DESCRIPTION |
| --- | --- | --- |
| 786987 | Input 1 | Optional description text |
| 786988 | Input 2 | Optional description text |
| ... | ... | ... |
| 965486 | Input n | Optional description text |

It would be readily apparent to one skilled in the relevant art to implement an alternate input table.

The function 214 component provides the processing (other than that which is specified by an interaction method) that the ARU service offering 102 is to perform at the service node. That is, the ARU service offering 102 executes the specified function. Parameters are optional with the function. More specifically, a function is a fully qualified reference that when called, executes the processing that the ARU service offering 102 is to perform at the service node. The function call may contain explicit value parameters (e.g. integer, real number, or character string) or reference parameters (e.g. variable reference). A function is specified as any one of the following:

(i) dynamic link library (DLL) reference;

(ii) fully qualified path name of the executable function;

(iii) memory address of the executable function;

(iv) node-jump directive for jumping to a specific component of a specified service node; and (v) function table entry handle.

A function table entry handle references a single table that is maintained separately and referenced by all of the service nodes of an ARU service offering 102. A function table allows a service node to reference existing executable functions at run time. Optionally, a function entry in the table may specify parameters, each of which may take on variables from the particular calling service node. This feature of the present invention facilitates reuse and sharing of executable functions for new ARU service offerings 102, and eliminates redundant function reference definition storage for a plurality of ARU service offerings 102 at run time. The preferred embodiment of a function table is sorted on handle to facilitate efficient searching. An example embodiment of a function table which contains entries referenced by a function table entry handle is as follows:

| HANDLE | FCN(parameters) | DESCRIPTION |
|--------|-----------------|-------------|
| 243992 | Function 1 | Optional description text |
| 243993 | Function 2 | Optional description text |
| ... | ... | ... |
| 325445 | Function n | Optional description text |

It would be readily apparent to one skilled in the relevant art to implement an alternate function table.

An example value of a FCN field of a function table entry is: ULONG Function ProcessOrder(INPUT, &CC_num,8, call_id). In this example, the ProcessOrder function is a dynamic link library (DLL). INPUT is a system defined variable for the last user (i.e., caller) input entered. CC_num is a node variable passed by reference that the function can modify. 8 is an explicit pass by value parameter. call_id is a node variable passed by value that the function cannot modify. The function ProcessOrder returns a four byte long integer return code, the convention for all functions.

The postfunction interactions 216 and postfunction messaging 218 components are similar in structure and function to the prefunction interactions 210 and prefunction messaging 208, respectively, however they provide postfunction processing (i.e., after processing function 214 component of service node object). The postfunction interactions 216 component provides the rules for determining which service node the caller wants to traverse to, or which processing to perform after the processing of the current service node. That is, the ARU service offering 102 receives a return code from the function 214 component and performs the corresponding processing.

The postfunction interactions 216 component is similar in structure and function to the prefunction interactions 208 component. That is, the postfunction interactions 216 component also comprises an ordered list of interaction method objects. The difference is the condition portion of a rule (i.e., interaction method object) is compared with function return codes rather than user (i.e., caller) input. Interaction method objects are described in greater detail above. The following conditions are valid for the postfunction interactions 216 component:

(i) Otherwise condition (i.e. do this interaction method if no other conditions are satisfied);

(ii) Ignore others condition (i.e. do unconditionally and ignore other interaction methods);

(iii) Do first condition (i.e. do unconditionally and then consider other interaction methods);

(iv) Do last condition (i.e. do unconditionally after processing all other interaction methods); and (v) Return code (RC) from the last function call that executed. The last function call that executed may be any function in ARU service offering 102 (i.e., function 214 component, or function from an interaction method object specified in either a prefunction interactions 210 component or a postfunction interactions 216 component) depending on caller interaction with the ARU service offering 102.

The postfunction messaging 218 component provides a caller with menu or prompt information. The last processing of a service node is playing the postfunction message information to the caller before exiting the service node. The postfunction messaging 218 component is similar in structure and function to the prefunction messaging 206 component. That is, the postfunction messaging 218 component also comprises a list of message objects. Message objects are described in greater detail above.

As described above, a service node object 202 comprises multiple optional components (components may be specified as null). However, a service node object 202 may also be specified as a table entry handle in a service node table. A service node table is a single table that is maintained separately and referenced by all of the service nodes of an ARU service offering 102. A service node table allows a service node to reference existing service node objects at run time. This feature of the present invention facilitates reuse of ARU service encodings, sharing of service nodes for new ARU service offerings 102, and eliminates redundant service node storage for a plurality of ARU service offerings 102 at run time. The preferred embodiment of a service node table is sorted on handle to facilitate efficient searching. An example embodiment of a service node table is as follows:

| HANDLE | SERVICE NODE | DESCRIPTION |
|--------|--------------|-------------|
| 112947 | Service node 1 | Optional description text |
| 112948 | Service node 2 | Optional description text |
| ... | ... | ... |
| 112999 | Service node n | Optional description text |

It would be readily apparent to one skilled in the relevant art to implement an alternate service node table.

The message table, interaction method table, input table, function table, and service node table do not have to be local to the processor, or computer system, handling a call. Any use of a handle (message table handle, interaction method table handle, input table handle, function table handle, service node table handle) can be qualified with a network address indicating the location of the particular table. For example, a message object may be comprised of a fully qualified message table entry handle. Therefore, an ARU device X which processes an ARU service offering 102 in response to a phone call may access a particular table local to an ARU device Y. Well known communications to retrieve the encoding by the handle in the request is performed.

2. Host system for executing a preferred environment of the present invention

Figure 3A:
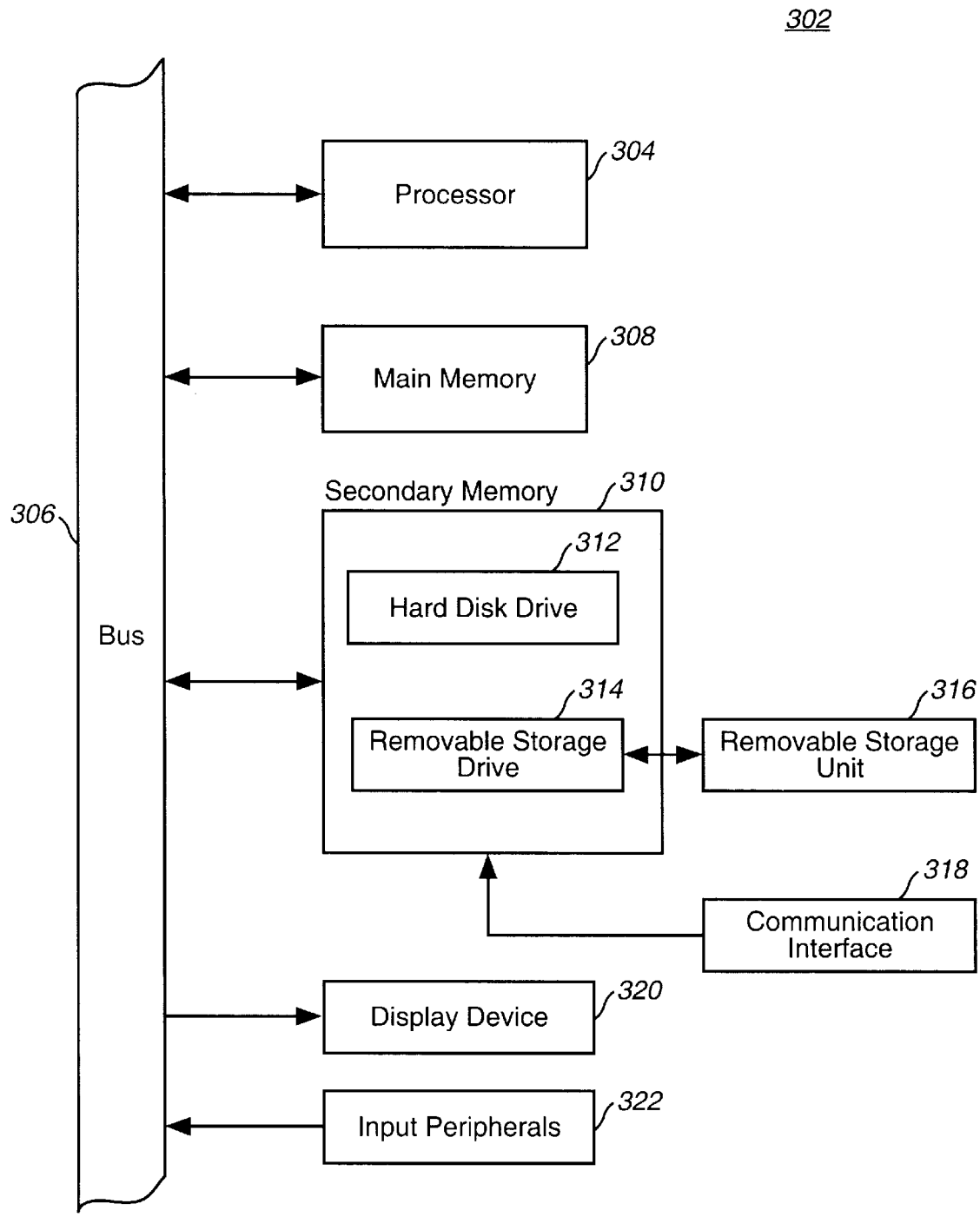
FIG. 3A is a block diagram illustrating an exemplary computer system in which the preferred embodiment of the present invention may be practiced.

The chosen embodiment of the present invention is computer software executing within a computer system, preferably a telecommunications switch environment. FIG. 3A shows an exemplary computer system. The computer system 302 includes one or more processors, such as a processor 304. The processor 304 is connected to a communication bus 306.

The computer system 302 also includes a main memory 308, preferably random access memory (RAM), and a secondary memory 310. The secondary memory 310 includes, for example, a hard disk drive 312 and/or a removable storage drive 314, representing a floppy disk drive, a magnetic tape drive, a compact disk drive, a program cartridge and cartridge interface, a removable memory chip (such as EPROM, or PROM), etc. which is read by and written to by a removable storage unit 316. Removable storage unit 316, also called a program storage device or a computer program product, represents a floppy disk, magnetic tape, compact disk, etc. As will be appreciated, the removable storage unit 316 includes a computer usable storage medium having stored therein computer software and/or data. The removable storage drive 314 reads from and/or writes to a removable storage unit 316 in a well known manner.

The computer system 302 may also include other similar means for allowing computer programs or other instructions to be loaded. Such means can include, for example, a communications interface 318. Communications interface 318 allows software and data to be transferred between computer system 302 and external devices. Examples of communications interface 318 can include a modem, a network interface (such as an Ethernet card), a communications port, etc. Software and data transferred via communications interface 318 are in the form of signals which can be electronic, electromagnetic, optical or other signals capable of being received by communications interface 318.

In this document, the term "computer program product" is used to generally refer to removable storage unit 316, a hard disk installed in hard disk drive 312, and signals transferred via communications interface 318. These computer program products are means for providing software to a computer system 302.

In an embodiment where the invention is implemented using software, the software may be stored in main memory 308, or in a computer program product and loaded into computer system 302 using removable storage drive 314, hard disk drive 312, or communications interface 318. The software, when executed by the processor 304, causes the processor 304 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

The preferred embodiment of the present invention is directed to execute on a computer system 302 using the UNIX operating system. UNIX is commercially available and is well known in the relevant art. The preferred embodiment of the present invention is implemented in software, and more specifically, is written in the programming language C or C++. The preferred embodiment is described in these terms for convenience purpose only. Other comparable computer systems 302, operating systems, and programming languages could alternatively be used.

The preferred embodiment of the graphical user interface (GUI) tool of the present invention is directed to a computer system 302 including a display device 320 and one or more input peripherals 322. The display device 320 represents a computer screen or monitor on which a GUI may be displayed. The input peripherals 322 include, for example, a keyboard, a mouse, a light pen, a pressure-sensitive screen, etc. which provide a user with the capability of entering input to the computer system 302.

Figure 3B:
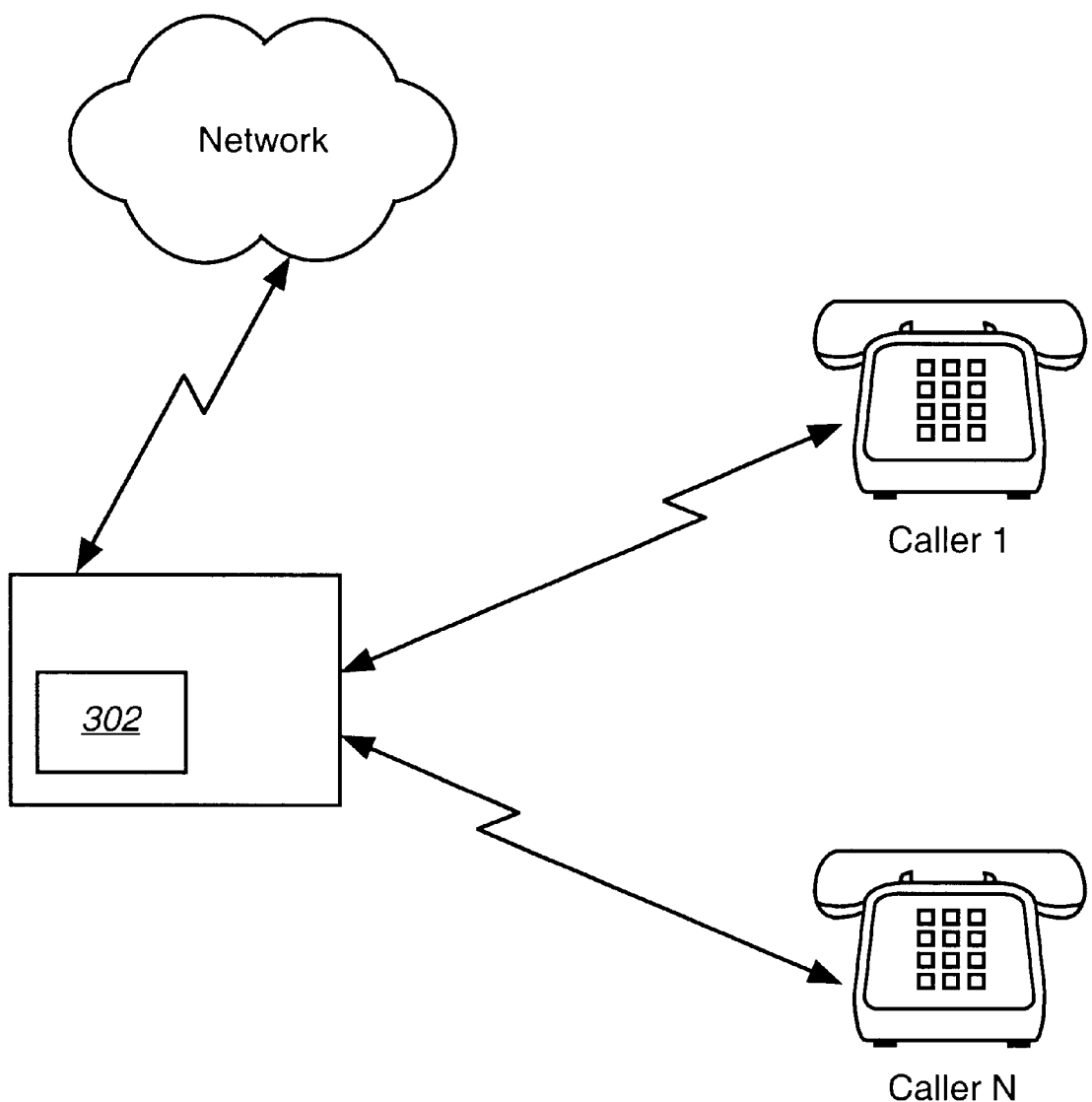
FIG. 3B is a diagram illustrating a high level description of an exemplary environment utilizing the present invention.

FIG. 3B is a block diagram of an automated response unit environment. The automated response unit environment can best be described referencing the processing of a typical call. A call is placed by a caller using a telephone 326. The call is received by a first local exchange network 328. A first local exchange network 328 comprises switches and termination equipment within a localized area. An example of a first local exchange network 328 is a local Bell operating company network such as Bell Atlantic. The first local exchange network 328 sends the call to a switch 330 in an interexchange network 332.

An interexchange network 332 comprises a plurality of switches or exchanges 330 that are located throughout a geographic area. For example, a national interexchange network 332 would comprise switches located throughout the nation. When a call is routed to the interexchange network 332, it is routed to one or more switches 330 within the interexchange network. The switch 330 will route the call to a bridging switch 334 which is another switch in the interexchange network unless the switch 332 that received the call is a bridging switch 334. In other words, if the call is received by a bridging switch 334, then the call may go through only the bridging switch 334 and not another switch 330 while routing through the interexchange network 332. The switches 330 in the interexchange network 332, including the bridging switches 334 may be implemented using DMS-250 switches manufactured by Nortel.

The bridging switch 334 sends the call to an automated call distributor 336. The automated call distributor 336 communicates with the intelligent services network application processor 338 to select an automated response unit 340A to handle the call. Automated response units 340 are logically defined in software as being in groups. The intelligent network service application processor 338 selects a automated response unit 340A and ensures that incoming calls are distributed among the logically defined groups. The automated call distributor 336 provides switching functionality between the selected automated response unit 340A and the interexchange network 330. The automated call distributor 336 may be implemented using the automated call distributor manufactured by Nortel.

The intelligent network service application processor 338 communicates to the automated response units 340 via operator network center computer systems, specifically, the operator network center wide area network 342 and the operator network center local area network 344. The operator network center wide area network 342 and the operator center local area network 344 assist the intelligent network service application processor 338 in directing the call to a automated response unit 340A. In addition, the operator center wide area network 342 and the operator center local area network 344 store some information used to process calls.

After the automated response unit 340A has completed processing the call, the automated response unit 340A releases the call back to the bridging switch 334 via the automated call distributor 336. The bridging switch 334 connects the call to the receiver 348 via a second local exchange network 346. Similar to a first local exchange network 328, a second local exchange network 346 comprises switches and termination equipment within a localized area. The example used in illustrating a first local exchange network 328, a local Bell operating company network such as Bell Atlantic, also applies to a second local exchange network 346.

Figure 4:
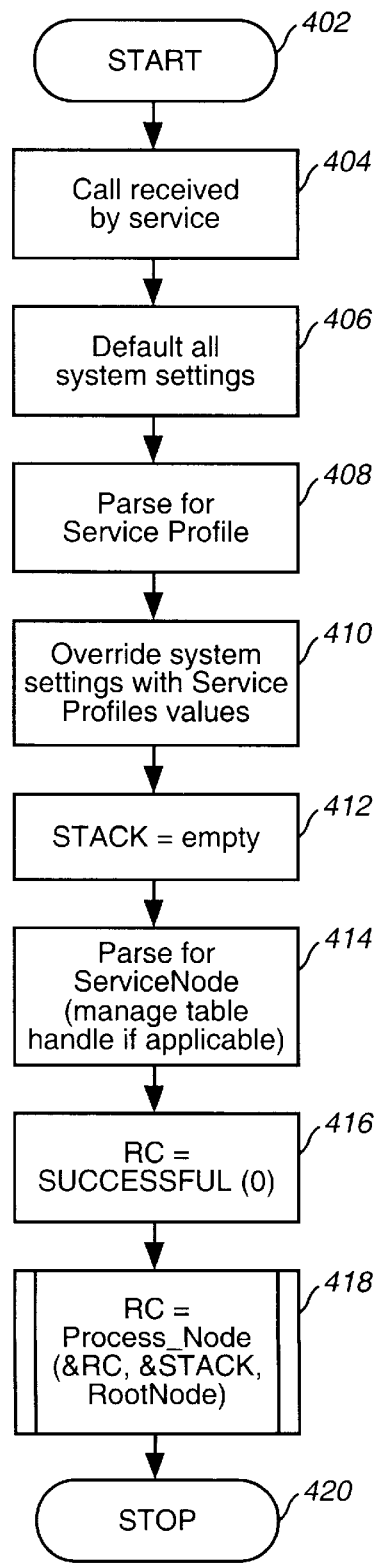
FIG. 4 is a control flow diagram illustrating the high-level operation of the preferred embodiment of an ARU service encoding interpreter.

3. Control flow of a preferred embodiment of an ARU service encoding interpreter FIG. 4 is a control flow diagram illustrating the high-level operation of an ARU service encoding interpreter 400 in which the ARU service offering 102 is encoded using the encoding formats. The present invention is described in terms of an interpreter 400 for convenience purpose only. It would be readily apparent to one skilled in the relevant art to apply the present invention to alternative embodiments, including a compiler embodiment.

Parsing the ARU service encoding assumes a pointer therein is appropriately updated for proper interpreter execution.

The interpreter 400 begins processing at step 402 and immediately proceeds to step 404. In step 404, the ARU service interpreter 400 receives a telephone call from a caller. Continuing to step 406, the interpreter 400 sets the default values for system settings found in the service profile. A service profile consists of special variable definitions that are used during processing of the ARU service. A service profile may include, but is not limited to, the following profile items:

| | |
|---|---|
| (a) User_entry_timeout | A time period for which the system is willing to wait for the caller input at any time. Expiration of the timeout warns the caller with the User_entry_timeout_message and then waits for User_entry_timeout one last time before terminating the session. Default is 30 seconds; |
| (b) User_entry_timeout_message | Played upon detecting expiration of User_entry_timeout as described above. Defaulted and maintainable; |
| (c) Session_timeout | Overall timeout value for an entire ARU session; if the time a caller connects to the ARU up through some current time exceeds this value, the Session_timeout_exit_message will play to the caller and the session will be dropped. Defaulted and maintainable; |
| (d) Session_timeout_exit_message | Played upon detecting expiration of Session_timeout as described above. Defaulted and maintainable; and |
| (e) Node_back_hot_key | Keypad button for backing up one Service node in the hierarchy at any time. Default is no hot key for this function. Maintainable. |

Continuing to step 408, the interpreter 400 parses for a service profile of the ARU service. The interpreter 400 then continues to step 410 in which it overrides the system default settings of step 406 with the value definitions in the service profile. Continuing to step 412, the interpreter 400 instantiates a STACK variable and initializes STACK to empty. The interpreter 400 continues to step 414. In step 414, the interpreter 400 parses the ARU service encoding for the root service node 104. If the parsed root service node 104 references a table handle, the interpreter 400 resolves the table handle to execute the ARU service offering 102. After parsing for the root service node 104, the interpreter 400 continues to step 416. In step 416, the interpreter 400 instantiates a return code (RC) variable and initializes it to 0 indicating that a function returned successfully. Continuing to step 418, the interpreter 400 makes a function call to Process_Node with the following parameters: address of the RC variable, address of the STACK variable, and pointer into the ARU service encoding to the root service node 104. The parameters are used by descending processing. The function Process_Node is a recursive function that processes the components of a service node which in this iteration is the root service node 104. Through recursive calls, the Process_Node function traverses the ARU service offering 102 according to the caller's selections and processes each visited service node accordingly. If a function is executed as the result of service node processing, it returns a RC when it has completed its processing. If a service node is processed that does not perform a function call, then the RC from the last function call from any previous execution is bubbled back. The function Process_Node is described in greater detail below. After processing the customer's requests via the ARU service offering 102, the interpreter 400 continues to step 420 and exits its processing.

Figure 5:
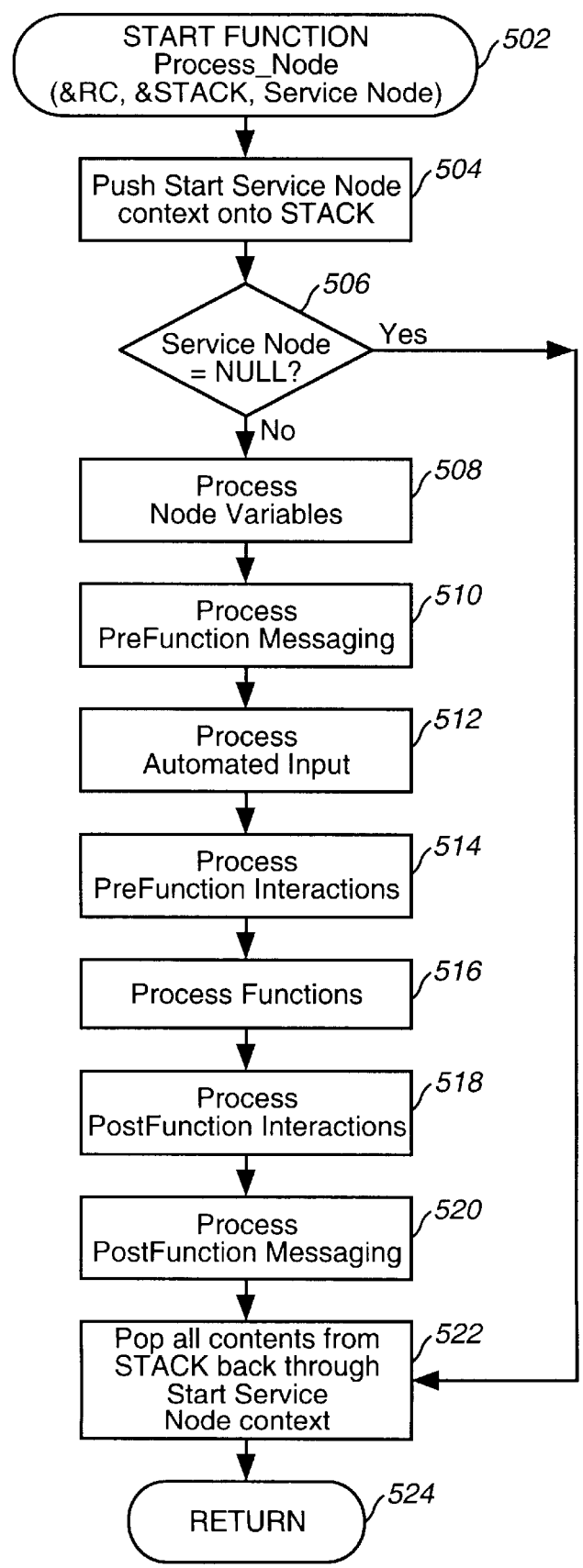
FIG. 5 is a control flow diagram illustrating the operation of the function Process_Node.

FIG. 5 is a control flow diagram illustrating the operation of step 418 and the processing of the function Process_Node. The interpreter 400 invokes the function Process_Node for each service node of the ARU service offering 104 that is visited according to the caller's menu selections. Processing begins at step 502 and immediately proceeds to step 504. In step 504, the interpreter 400 pushes a start context of the service node onto the STACK. The start context comprises a record which includes a pointer into the parsed encoding, a pointer to the current run time interpreter stack position, and a label of the context type (label=start_service_node in this case). There are two stacks in the interpreter descriptions. The STACK variable is used to manage service node and component processing according to a caller's interaction with the ARU service offering 102, as well as processing defined by the ARU service encoding. The interpreter itself is executed on a programming stack as known to those skilled in the art at processor 304 and programming language originated software which executes on processor 304. Continuing to step 506, the interpreter 400 determines whether the service node is null. If the service node is null, the interpreter 400 proceeds to step 522. In step 522, the start content of the service node is removed off from STACK. Step 522 proceeds to step 524. In step 524, the interpreter 400 has completed its processing of the service node and returns the last RC.

Referring again to step 506, if the interpreter 400 determines that the service node is not null, the interpreter 400 proceeds to step 508. In step 508, the interpreter 400 processes any node variables 206 component of the service node. Continuing to step 510, the interpreter 400 processes any prefunction messaging 208 of the service node. Continuing to step 512, the interpreter 400 processes any automated input 212 component of the service node. Continuing to step 514, the interpreter 400 processes any prefunction interactions 210 component of the service node. Continuing to step 516, the interpreter 400 processes any function 214 component of the service node. Continuing to step 518, the interpreter 400 processes any postfunction interactions 216 component of the service node. Continuing to step 520, the interpreter 400 processes any prefunction messaging 218 component of the service node. Steps 508–520 are described in greater detail below.

Continuing to step 522, the interpreter 400 pops all of the contents from the STACK variable through the start context of the service node 104 which was pushed at step 504. After the interpreter 400 has completed its processing of the service node, the interpreter 400 continues to step 524 at which it has completed its processing and returns the last RC.

Figure 6:
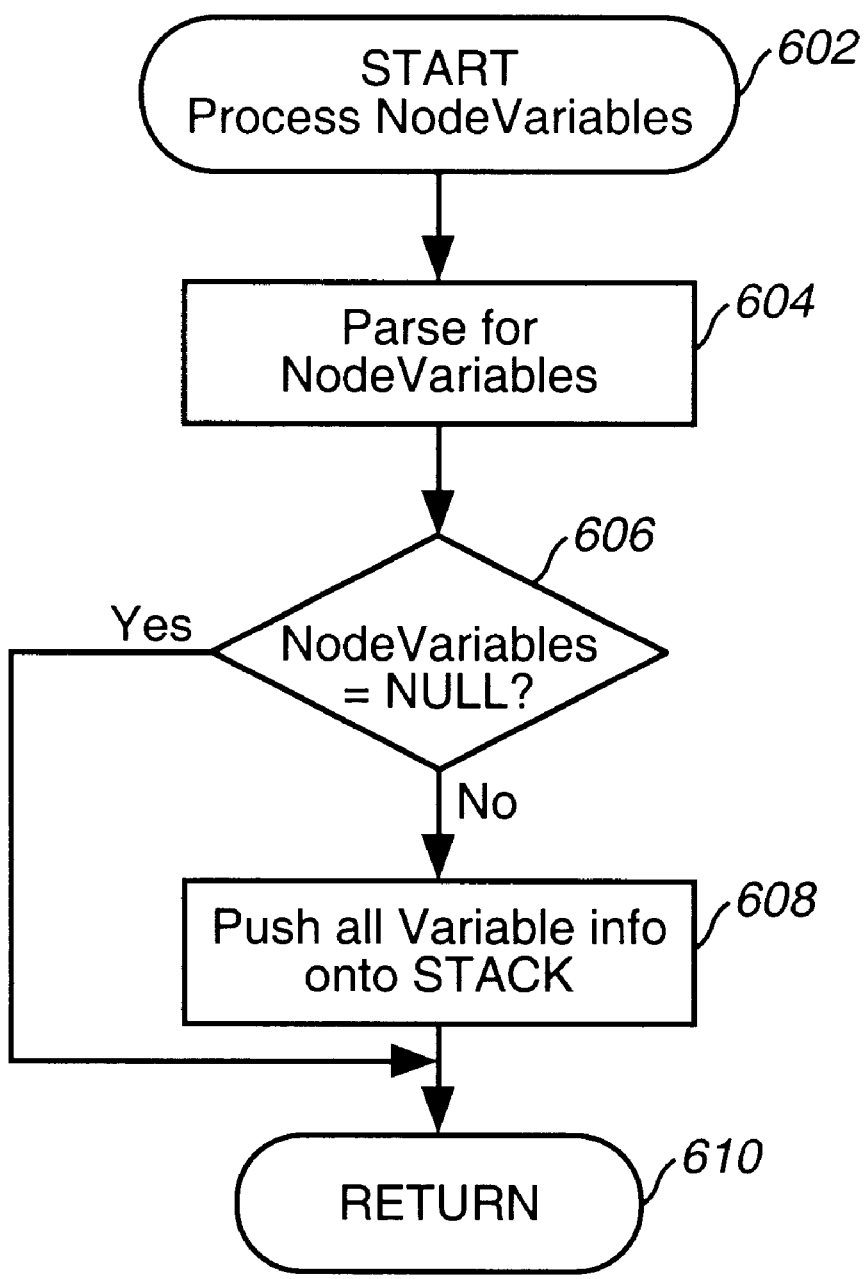
FIG. 6 is a control flow diagram illustrating the operation of processing NodeVariables.

FIG. 6 is a control flow diagram illustrating the operation of step 508 and the processing of the node variables 206 component of a service node. Processing begins at step 602 and immediately proceeds to step 604. In step 604, the interpreter 400 parses for node variables 206. Continuing to step 606, the interpreter 404 determines whether there are any node variables for processing. If there are no node variables to process, the interpreter 400 proceeds to step 610. In step 610, the interpreter 400 has completed its processing of the node variables and returns control to FIG. 5.

Referring again to step 606, if the interpreter 400 determines that there is one or more node variables to process, the interpreter 400 proceeds to step 608. In step 608, the interpreter 400 pushes the information for each variable onto the STACK variable. Preferably, variables are fully elaborated to a form such as showed in Appendix B. A pointer to the structure encoding is pushed onto STACK along with the variable name and variable type. The last definition (i.e., value) for a variable name, of a particular variable type, pushed onto STACK, is used for references of the variable. This allows overloading a single variable name by specifying different types. It also allows scoping of variables to appropriate service nodes of the ARU service offering 102. Continuing to step 610, the interpreter 400 has completed its processing of the node variables and returns control to FIG. 5.

Figure 7:
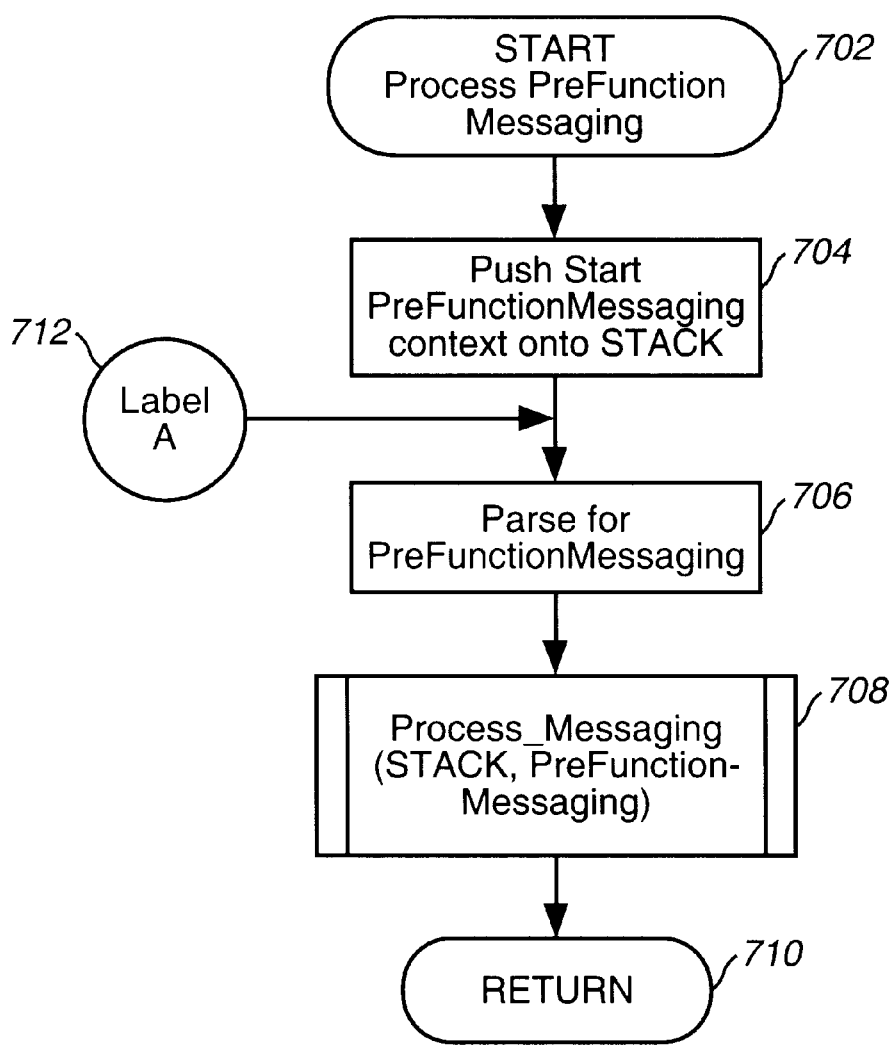
FIG. 7 is a control flow diagram illustrating the operation of processing PreFunction Messaging.

FIG. 7 is a control flow diagram illustrating the operation of step 510 and the processing of the prefunction messaging 208 component of a service node. Processing begins at step 702 and immediately proceeds to step 704. In step 704, the interpreter 400 pushes a start context for prefunction messaging 208 component onto the STACK variable. The start context comprises a record which includes a pointer into the parsed encoding, a pointer to the current run time interpreter stack position, and a label of the context type (label =start__ prefunction__messaging in this case). All contexts pushed onto, and popped from STACK comprise the same record with values appropriate at the time the record is pushed onto STACK. Continuing to step 706, the interpreter 400 parses for prefunction messaging 208. The interpreter 400 then continues to step 708. In step 708, the interpreter 400 invokes a ProcessMessaging function with the following parameters: the STACK and a flag identifying the interpreter's prefunction messaging function as the calling function. The Process__Messaging function performs the actual processing of the prefunction message and is described in greater detail below. After the prefunction message is processed, the interpreter 400 continues to step 710. In step 710, the interpreter 400 has completed its processing of prefunction messages and returns control to FIG. 5.

Referring again to FIG. 7, label A 712 represents a location in the interpreter's programming stack to which one service node can jump to another service node. More specifically, if the caller selects a specific menu selection at a first service node, the menu selection may jump the caller to a second service node in the ARU service offering 102. A caller may jump to any one of the following components of the second service node: prefunction messaging 208, prefunction interactions 210, function 214, postfunction interactions 216, and postfunction messaging 218. The location in each component to which a caller may jump is denoted by a label on the appropriate control flow diagram. For example, label A 712 on FIG. 7 represents the location to which a caller may jump for the prefunction messaging 208 component of a service node.

Figure 8:
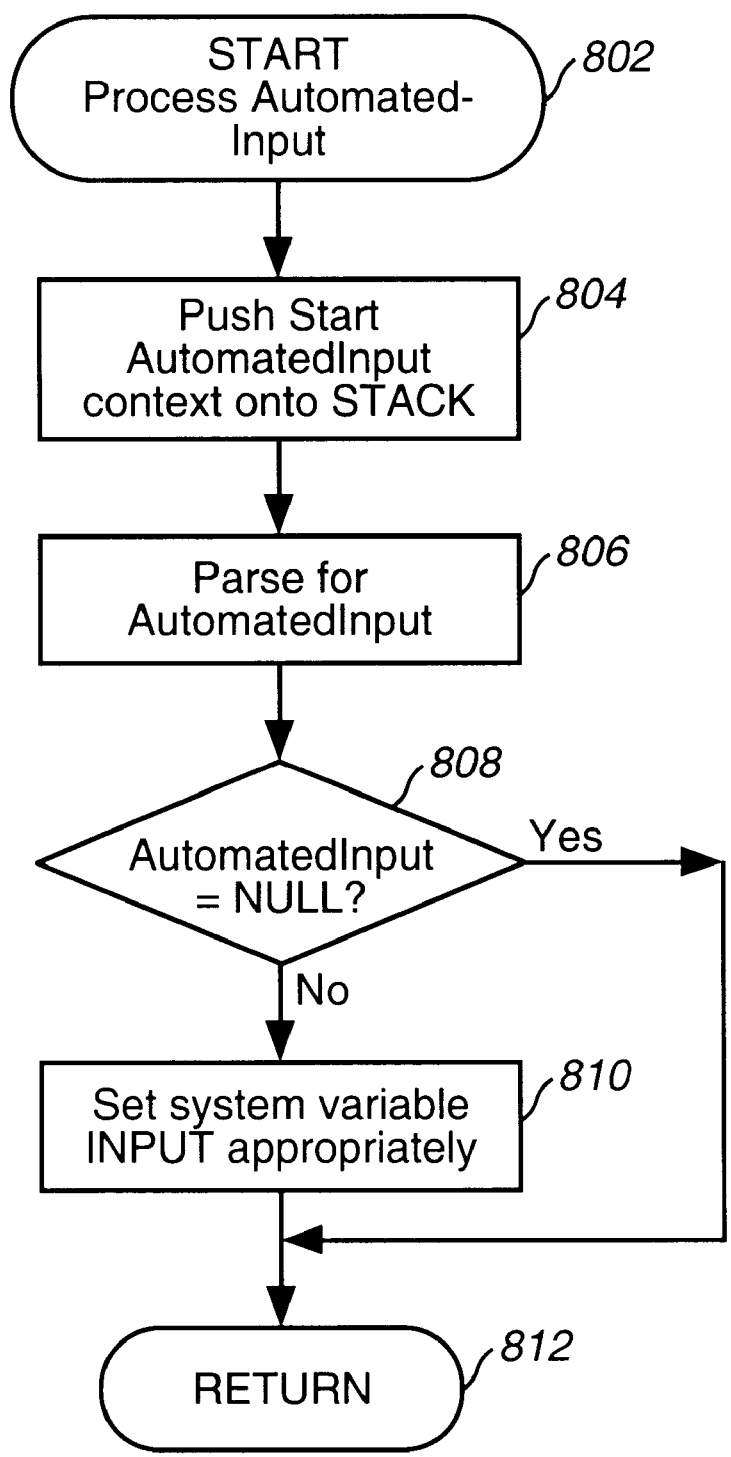
FIG. 8 is a control flow diagram illustrating the operation of processing Automated Input.

FIG. 8 is a control flow diagram illustrating the operation of step 512 and the processing of the automated input 212 component of a service node. Processing begins at step 802 and immediately proceeds to step 804. In step 804, the interpreter 400 pushes a start context for automated input onto the STACK variable. Continuing to step 806, the interpreter 400 parses for automated input 212. The interpreter 400 then continues to step 808. In step 808, the interpreter 400 determines whether there is any automated input. If there is no automated input, that is AutomaticInput= null, the interpreter 400 proceeds to step 812. In step 812, the interpreter 400 has completed processing of automated input and returns control to FIG. 5.

Referring again to step 808, if the interpreter 400 determines that there is automated input, the interpreter 400 proceeds to step 810. In step 810, the interpreter 400 sets a global system variable INPUT appropriately. The INPUT variable is set by the system according to caller input. The variable INPUT always contains the most recent caller input. Functions of the interpreter 400 access INPUT as needed. Setting the INPUT variable in step 810 is as if the user (i.e., caller) actually entered that input. After the automated input has been processed, the interpreter 400 continues to step 812. In step 812, the interpreter 400 has completed its processing of automated input and returns control to FIG. 5.

Figure 9:
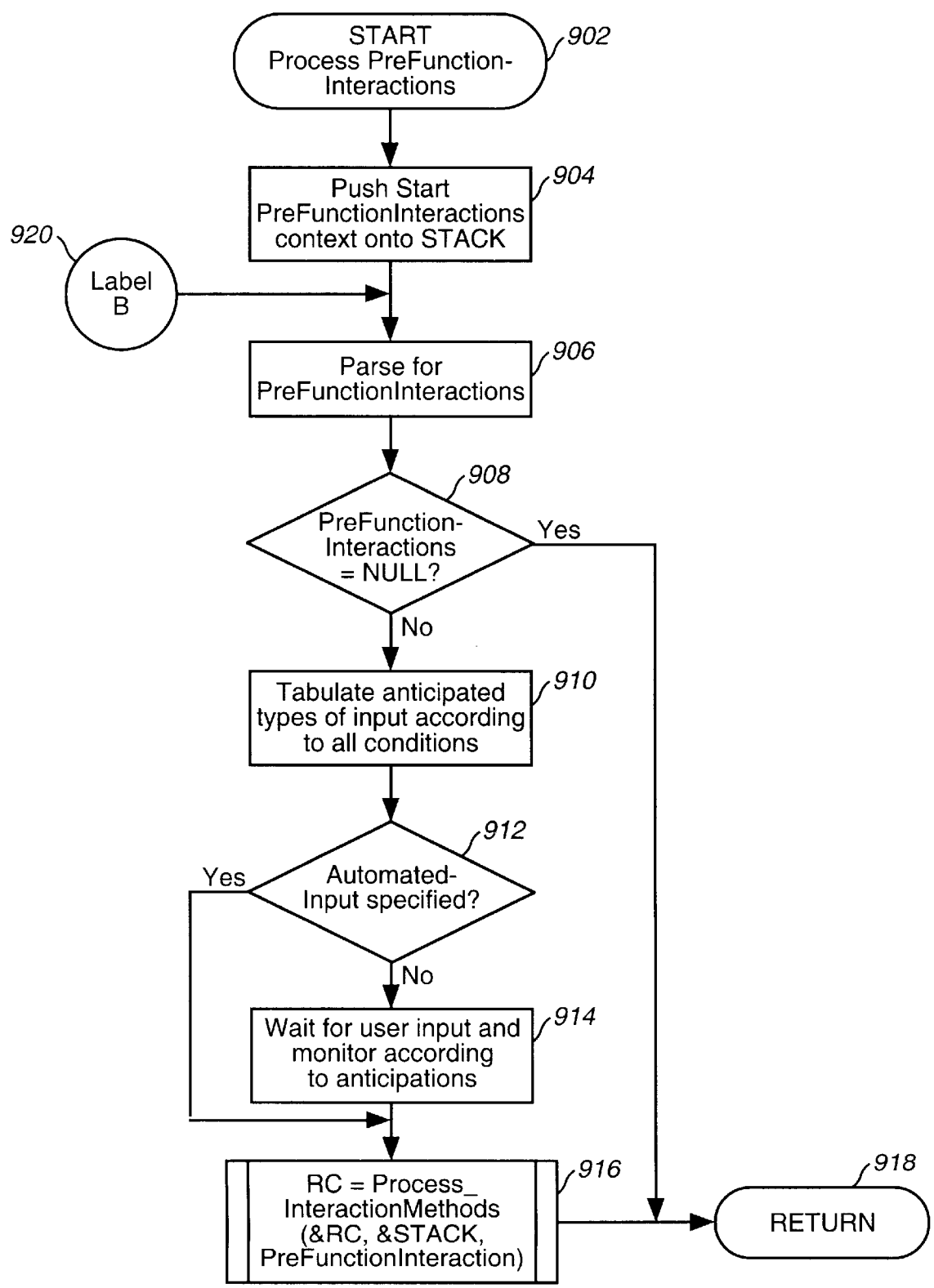
FIG. 9 is a control flow diagram illustrating the operation of processing PreFunction Interactions.

FIG. 9 is a control flow diagram illustrating the operation of step 514 and the processing of the prefunction interactions 210 component of a service node. Processing begins at step 902 and immediately proceeds to step 904. In step 904, the interpreter pushes a start context for prefunction interactions onto the STACK variable. Continuing to step 906, the interpreter 400 parses for prefunction interactions 210. The interpreter 400 then continues to step 908. In step 908, the interpreter 400 determines whether there are any interaction method objects of prefunction interactions 210. If there are no prefunction interactions, that is PreFunctionInteractions=null, the interpreter 400 proceeds to step 918. In step 918, the interpreter 400 has completed processing of prefunction interactions and returns control to FIG. 5.

Referring again to step 908, if the interpreter 400 determines that there are prefunction interactions, the interpreter 400 proceeds to step 910. In step 910, the interpreter 400 traverses the list of prefunction interactions and tabulates the anticipated types of input for each prefunction interaction according to the condition specified in interaction method objects. Continuing to step 912, the interpreter 400 determines whether there was any automated input specified; that is, whether the INPUT variable contains a value which was set by the automated input 212 component of this same currently processed service node. If an automated input was specified, the interpreter 400 proceeds to step 916 to invoke a Process__InteractionMethods function. Step 916 is described in greater detail below.

Referring again to step 912, if an automated input was not specified, the interpreter 400 proceeds to step 914. In step 914, the interpreter 400 waits for the caller to input telephone keypad information according to outgoing messaging so far heard up to this point. The interpreter 400 also monitors the caller's input according to the anticipated types of input defined in prefunction interactions. After receiving the caller's input, the interpreter 400 continues to step 916 to invoke the prefunction interaction corresponding to the caller's input.

In step 916, the interpreter 400 invokes the function Process__InteractionMethods with the following parameters: an address to RC, an address to STACK, and a flag identifying the interpreter's prefunction interactions function as the calling function. The function Process__ InteractionMethods returns the RC indicating the completion status of the last executed function. After step 916 processing, the interpreter 400 continues to step 918. In step 918, the interpreter 400 has completed the processing of prefunction interactions and returns control to FIG. 5.

Referring again to FIG. 9, label B 920 represents a location in the interpreter 400 to which one service node can jump to another service node. More specifically, label B 920 represents the location to which a caller may jump for the prefunction interactions 210 component of the particular service node.

Figure 10:
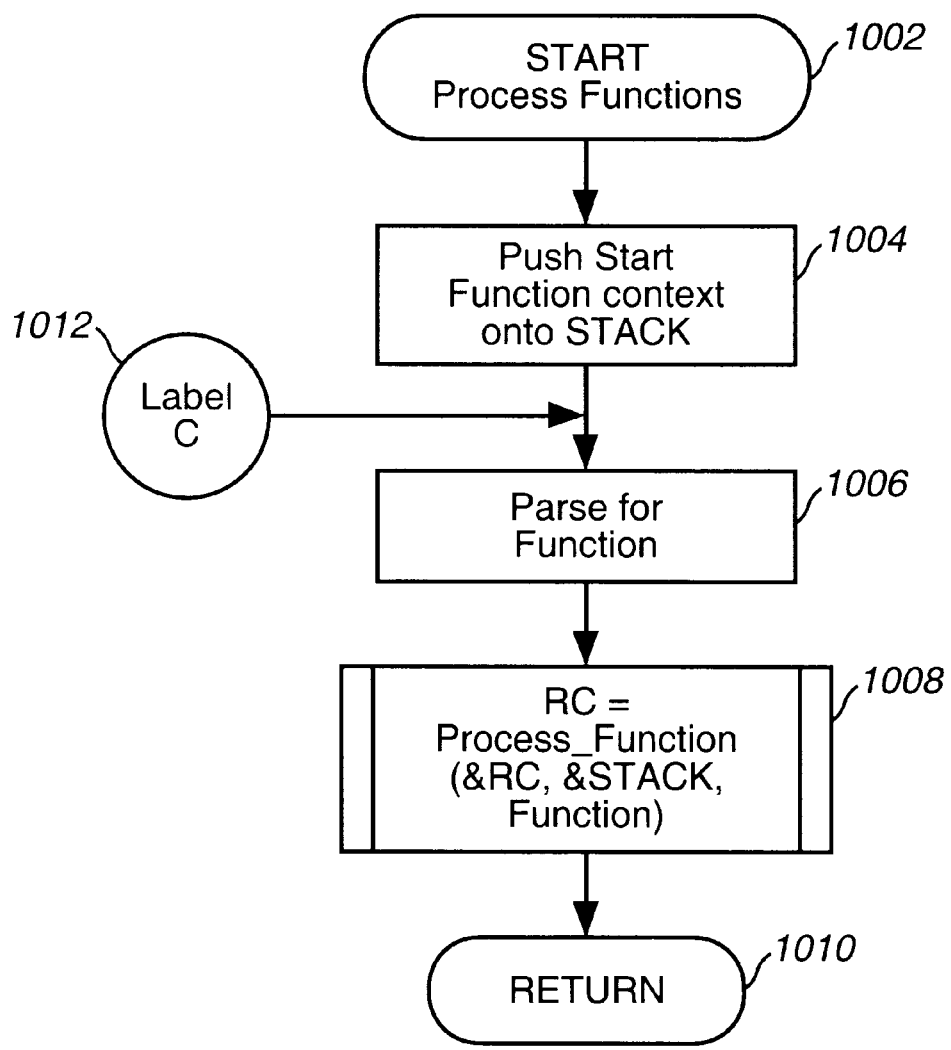
FIG. 10 is a control flow diagram illustrating the operation of processing of Functions.

FIG. 10 is a control flow diagram illustrating the operation of step 516 and the processing of the function 214 component of a service node. Processing begins at step 1002 and immediately proceeds to step 1004. In step 1004, the interpreter 400 pushes a start context for function onto the STACK variable. Continuing to step 1006, the interpreter 400 parses for function 214. The interpreter 400 then continues to step 1008. In step 1008, the interpreter 400 invokes a Process_Function function with the following parameters: the address of the RC, the address of the STACK, and the function information that was parsed in step 1006. An alternate embodiment of the function parameter is a pointer into the ARU service encoding, specifically to the function information. The alternative embodiment would impose function information parsing in the Process_Function function. The Process_Function function performs the actual processing of the function and is described in greater detail below. After the function is processed, the interpreter 400 continues to step 1010. In step 1010, the interpreter 400 has completed its processing of function 214 and returns control to FIG. 5.

Referring again to FIG. 10, label C 1012 represents a location in the interpreter 400 to which one service node can jump to another service node. More specifically, label C 1012 represents the location to which a caller may jump for the function 214 component of the particular service node.

Figure 11:
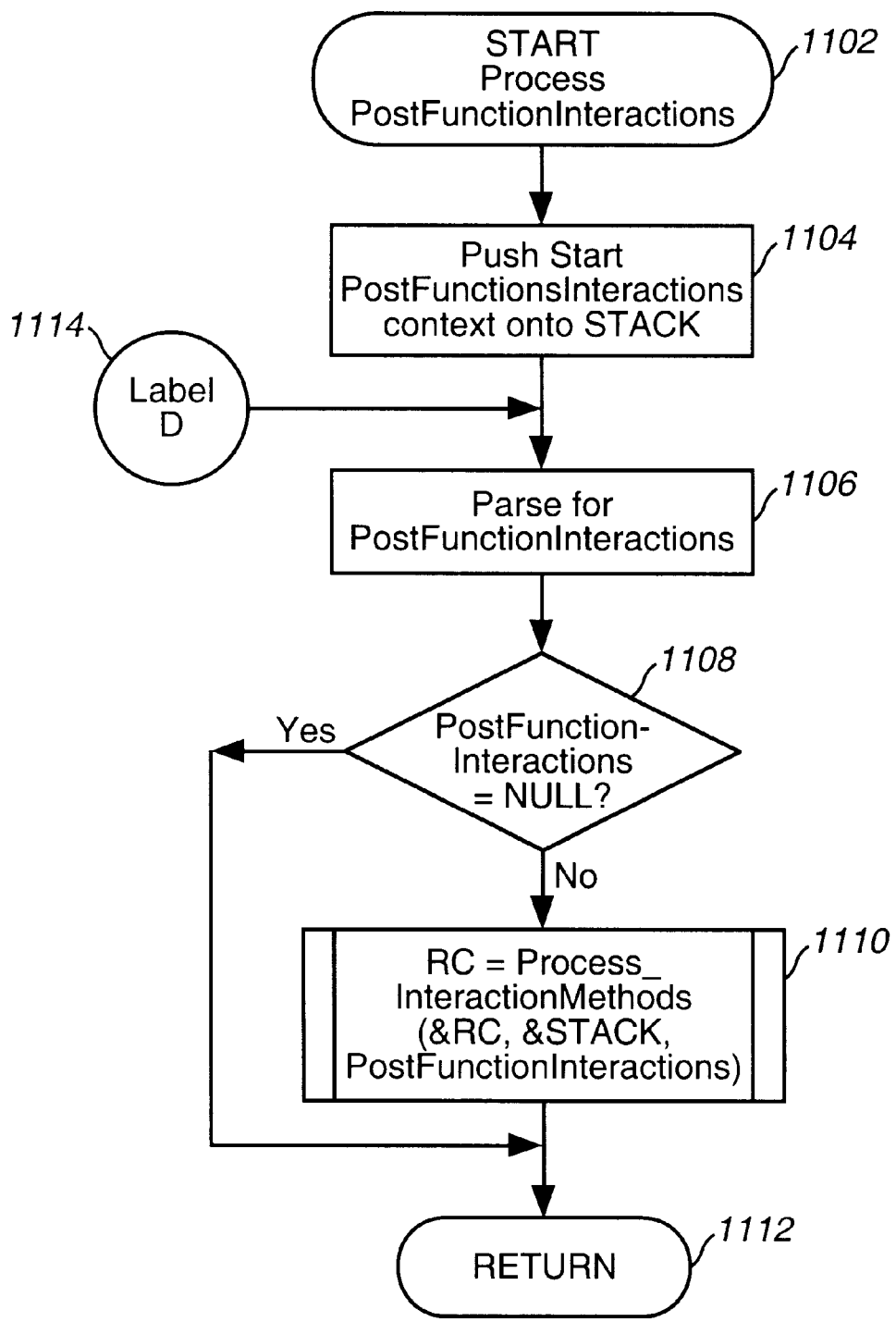
FIG. 11 is a control flow diagram illustrating the operation of processing PostFunction Interactions.

FIG. 11 is a control flow diagram illustrating the operation of step 518 and processing of the postfunction interactions 216 component of a service node. Processing begins at step 1102 and immediately proceeds to step 1104. In step 1104, the interpreter pushes a start context for postfunction interactions onto the STACK variable. Continuing to step 1106, the interpreter 400 parses for postfunction interactions 216. The interpreter 400 then continues to step 1108. In step 1108, the interpreter 400 determines whether there are any postfunction interactions. If there are no postfunction interactions, that is PostFunctionInteractions=null, the interpreter 400 proceeds to step 1112. In step 1112, the interpreter 400 has completed processing of postfunction interactions and returns control to FIG. 5.

Referring again to step 1108, if the interpreter 400 determines that there are postfunction interactions, the interpreter 400 proceeds to step 1110. In step 1110, the interpreter 400 invokes the function Process_InteractionMethods with the following parameters: an address to RC, an address to STACK, and a flag identifying the interpreter's postfunction interactions function as the calling function. The function Process_InteractionMethods returns the RC indicating the completion status of the last executed function. After step 1110 processing, the interpreter 400 continues to step 1112. In step 1112, the interpreter 400 has completed its processing of postfunction interactions and returns control to FIG. 5. The Process_InteractionMethods function of step 1110 is the same function invoked by step 916 for the processing of prefunction interactions.

Referring again to FIG. 11, label D 1114 represents a location in the interpreter 400 to which one service node can jump to another service node. More specifically, label D 1114 represents the location to which a caller may jump for the postfunction interactions 216 component of the particular service node.

Figure 12:
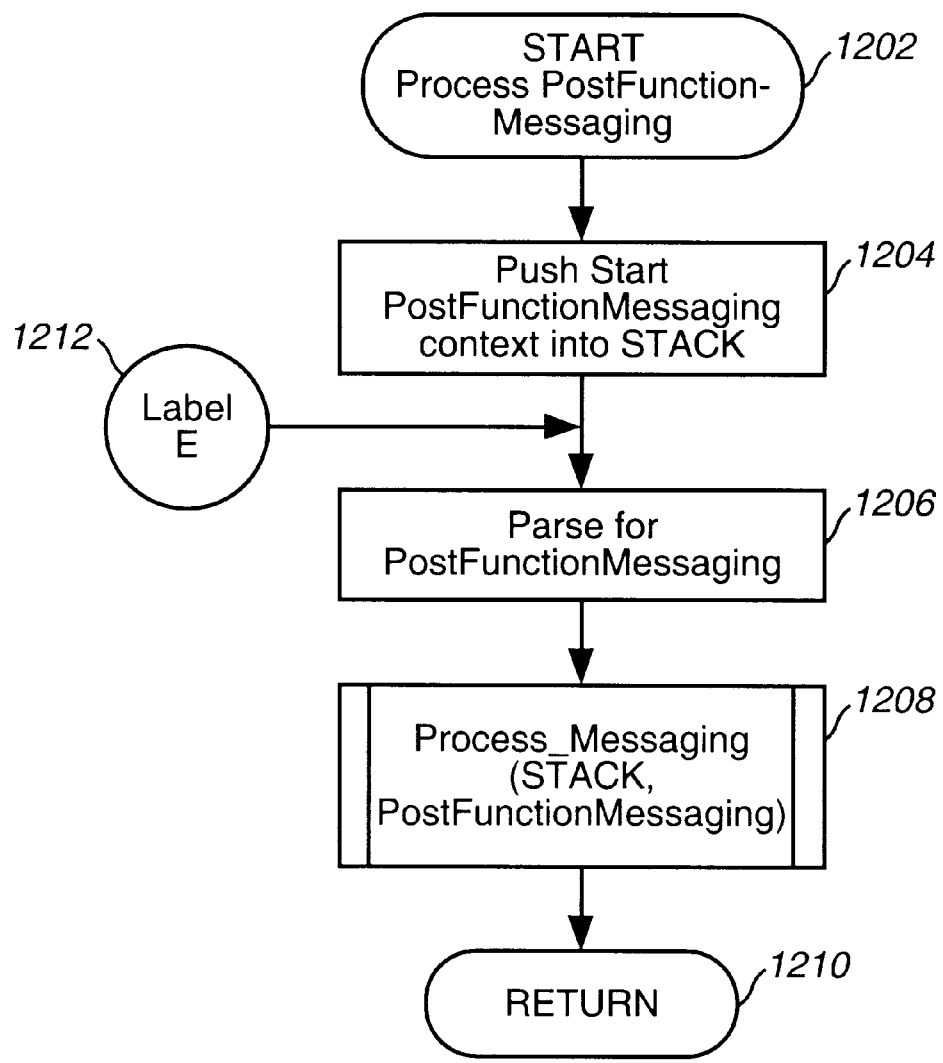
FIG. 12 is a control flow diagram illustrating the operation of processing PostFunction Messaging.

FIG. 12 is a control flow diagram illustrating the operation of step 520 and the processing of the postfunction messaging 218 component of a service node. Processing begins at step 1202 and immediately proceeds to step 1204. In step 1204, the interpreter 400 pushes a start context for postfunction messaging 218 onto the STACK variable. Continuing to step 1206, the interpreter 400 parses for postfunction messaging 218. The interpreter 400 then continues to step 1208. In step 1208, the interpreter 400 invokes a Process_Messaging function with the following parameters: the STACK and a flag identifying the interpreter's postfunction messaging function as the calling function. The Process_Messaging function is the same function invoked by step 708 for the processing of a prefunction message. The Process-Messaging function performs the actual processing of the postfunction messaging and is described in greater detail below. After step 1208 processing, the interpreter 400 continues to step 1210. In step 1210, the interpreter 400 has completed its processing of postfunction messaging and returns control to FIG. 5.

Referring again to FIG. 12, label E 1212 represents a location in the interpreter 400 to which one service node can jump to another service node. Ad More specifically, label E 1212 represents the location to which a caller may jump for the postfunction messaging 218 component of the particular service node.

Figure 13:
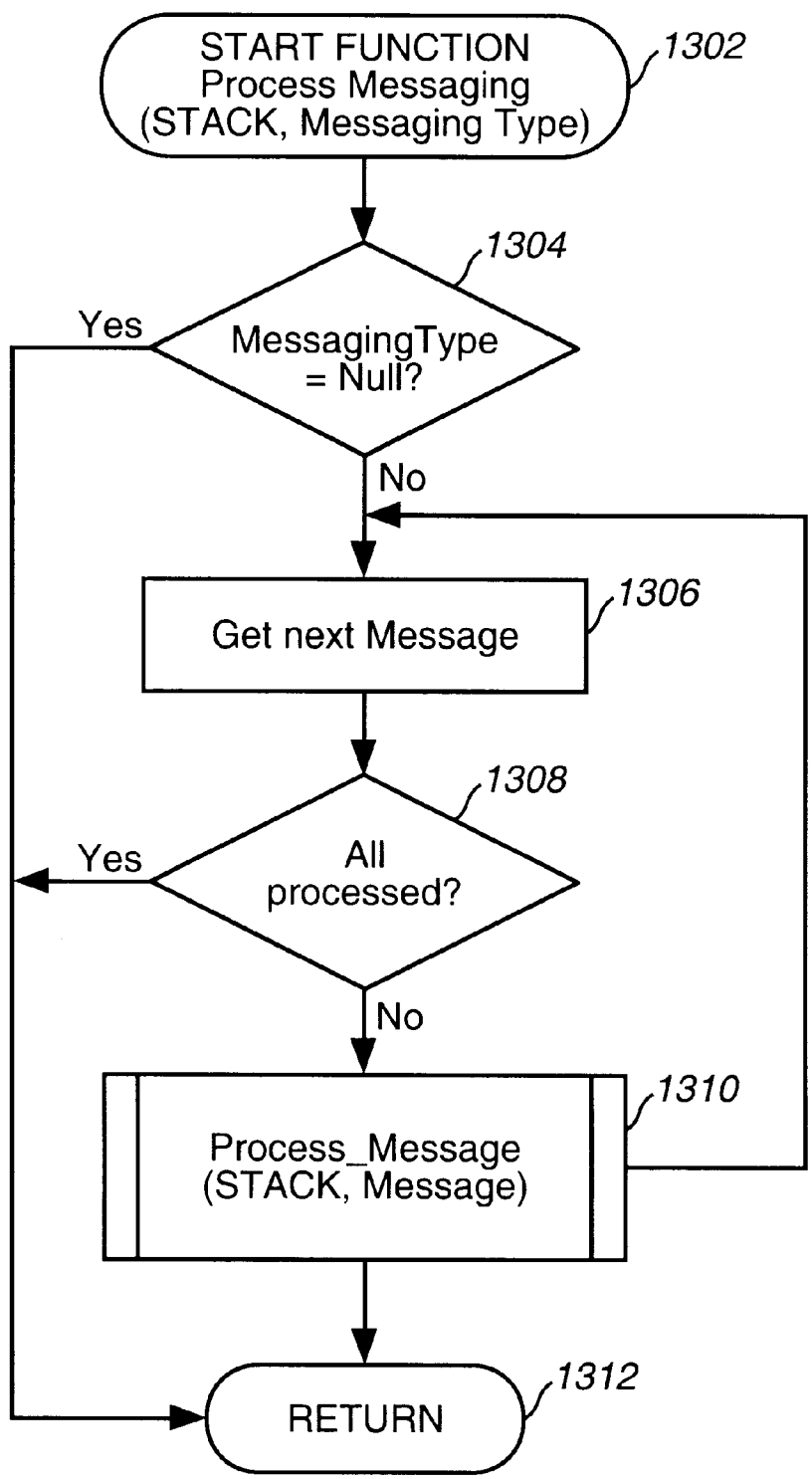
FIG. 13 is a control flow diagram illustrating the operation of processing the function Process_Messaging.

FIG. 13 is a control flow diagram illustrating the operation of steps 708 and 1208 and the processing of the function Process_Messaging. The Process_Messaging function is invoked for the processing of the prefunction messaging 208 and the postfunction messaging 218 components of a service node. Processing begins at step 1302 and immediately proceeds to step 1304. In step 1304, the interpreter 400 determines whether the component (prefunction messaging 208 or postfunction messaging 218) is null. The particular component is identified by the MessagingType parameter. As mentioned above, appropriate incrementation of the ARU source encoding pointer is assumed. If the component is null, there is no message to process. Therefore, the interpreter 400 proceeds to step 1312. In step 1312, the interpreter 400 has completed its processing of the messaging component and returns control to the invoking function.

Referring again to step 1304, if the interpreter 400 determines that the component is not null, the interpreter 400 proceeds to step 1306. In step 1306, the interpreter 400 gets the next message (or the first) in the component. Continuing to step 1308, the interpreter 400 determines whether it has processed all of the messages in the component. If the interpreter 400 determines that it has processed all of the messages in the component, the interpreter 400 proceeds to step 1312. In step 1312, the interpreter has completed its processing of the messages and returns control to the invoking function.

Referring again to step 1308, if the interpreter 400 determines that it has not processed all of the messages in the component, the interpreter 400 proceeds to step 1310. In step 1310, the interpreter 400 invokes the function Process_Message with the following parameters: the STACK variable, and the particular message object (Message) to be processed. The function Process_Message is described in greater detail below. After the interpreter 400 has processed the message, the interpreter 400 returns to step 1306 to get the next message in the MessagingType list. Step 1306 is described in greater detail above. Steps 1306, 1308, and 1310 define an iterative loop to process all message objects in the component.

Figure 14:
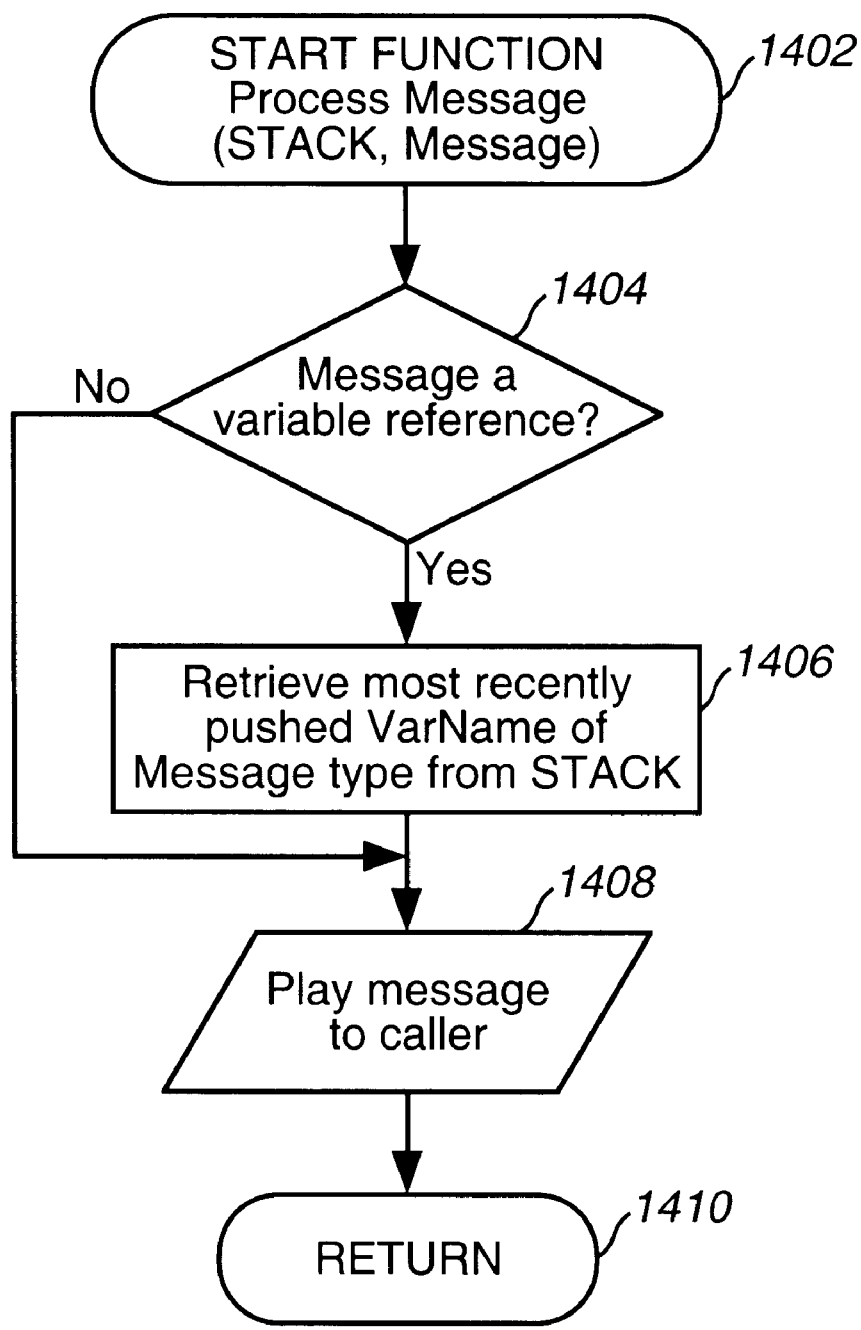
FIG. 14 is a control flow diagram illustrating the operation of processing the function Process_Message.

FIG. 14 is a control flow diagram illustrating the operation of step 1310 and the processing of the function Process_Message. Processing begins at step 1402 and immediately proceeds to step 1404. In step 1404, the interpreter 400 determines whether the message to be processed is an unresolved variable reference. A variable reference indicates that the message is assigned to a node variable. Therefore, the variable reference must be resolved before the message can be played to the customer. If the message is not an unresolved variable reference, the interpreter 400 proceeds to step 1408. Step 1408 is described in greater detail below.

Referring again to step 1404, if the interpreter 400 determines that the message to be processed is an unresolved variable reference, the interpreter 400 proceeds to step 1406.

In step 1406, the interpreter 400 retrieves the most recently pushed variable name, VarName, of the message type from the STACK. The interpreter 400 retrieves the most recently pushed variable name because variable names can be overloaded; therefore, the interpreter 400 accesses the most recent definition by name and type. After the interpreter 400 has resolved the variable name, the interpreter 400 proceeds to step 1408. The variable value is assumed to be elaborated on the STACK.

In step 1408, the interpreter 400 plays the message to the caller. Step 1408 appropriately plays the message according to the particular message object type. Continuing to step 1410, the interpreter 400 has completed the processing of step 1310 and returns control to FIG. 13.

Figure 15:
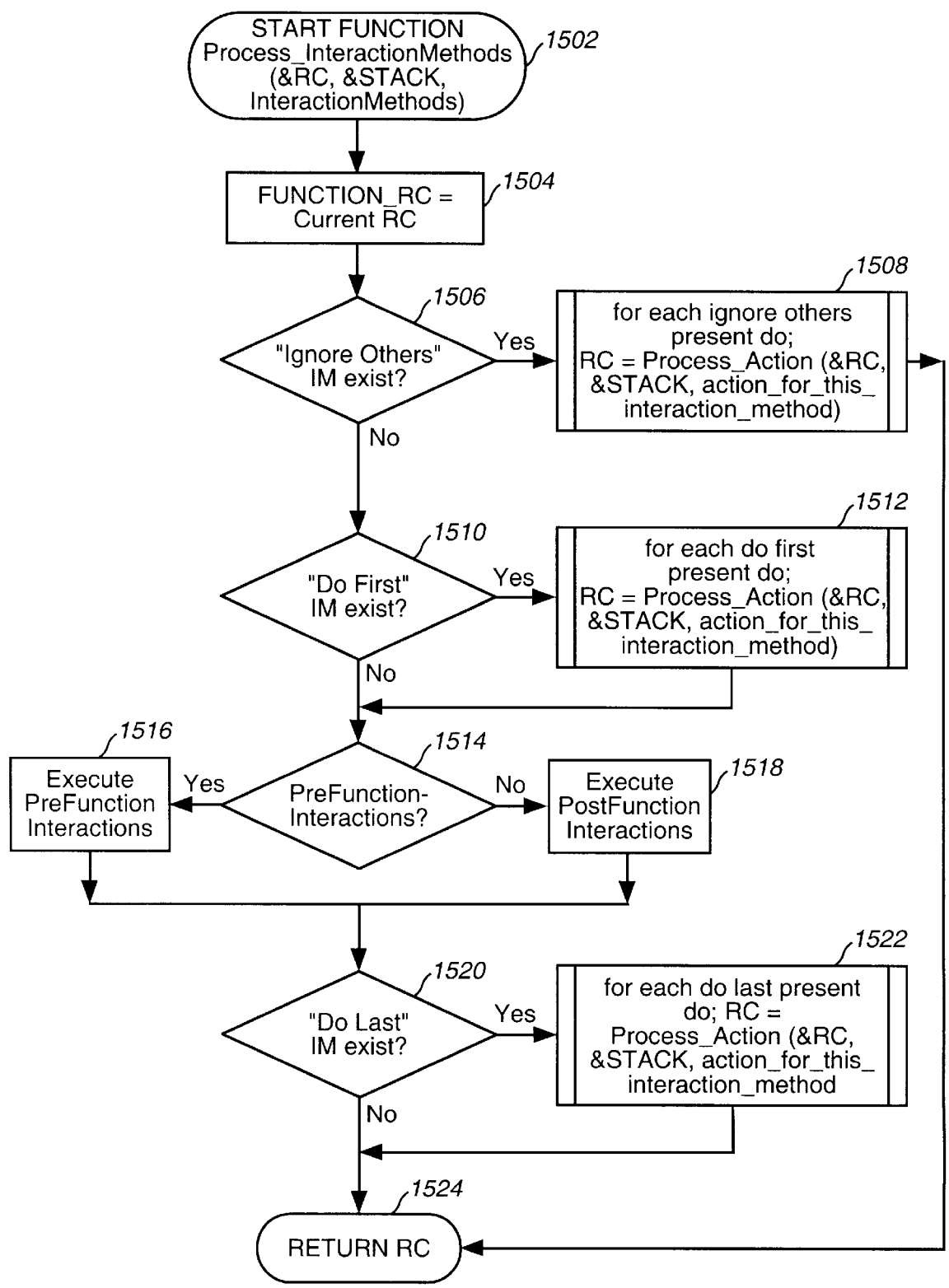
FIG. 15 is a control flow diagram illustrating the operation of processing the function Process_InteractionMethods.

FIG. 15 is a control flow diagram illustrating the operation of steps 916 and 1110 and the processing of the function Process_InteractionMethods. The Process_InteractionMethods function is invoked for the processing of the prefunction interactions 210 and the postfunction interactions 216 components of a service node. Processing begins at step 1502 and immediately proceeds to step 1504. In step 1504, the interpreter 400 initializes a local variable FUNCTION_RC to the current value of RC. Continuing to step 1506, the interpreter 400 determines whether an "ignore others" interaction method (IM) exists. If an "ignore others" interaction method exists, the interpreter 400 proceeds to step 1508. In step 1508, the interpreter 400 loops through all "ignore others" interaction methods for the particular component (prefunction interactions 210 or postfunction interactions 216). The particular component is identified by the InteractionMethods parameter. For each "ignore others," the interpreter 400 invokes the function Process_Action with the following parameters: the address of RC, the address of STACK, and the action for the "ignore others" interaction method. The function Process_Action returns a completion code that is assigned to the variable RC. After the interpreter 400 processes the "ignore others" interaction methods, the interpreter 400 continues to step 1524. In step 1524, the interpreter 400 has completed its processing of the function Process_InteractionMethods and returns control along with the RC value. Referring again to step 1506, if the interpreter 400 determines that an "ignore others" interaction method does not exist, the interpreter 400 proceeds to step 1510. In step 1510, the interpreter 400 determines whether a "do first" interaction method (IM) exists. If a "do first" interaction method exists, the interpreter 400 proceeds to step 1512. In step 1512, the interpreter 400 loops through all "do first" interaction methods for the particular component. For each "do first," the interpreter 400 invokes the function Process_Action with the following parameters: the address of RC, the address of STACK, and the action for the "do first" interaction method. The function Process_Action returns a completion code that is assigned to the variable RC. After the interpreter 400 processes the "do first" interaction methods, the interpreter 400 continues to step 1514.

Referring again to step 1510, if the interpreter 400 determines that there are no "do first" interaction methods to process, the interpreter 400 also proceeds to step 1514.

In step 1514, the interpreter 400 determines whether the Process_InteractionMethods function was invoked via the prefunction interactions 210 component of a service node or the postfunction interactions 216 component (using the InteractionMethods parameter). If the Process_InteractionMethods function was invoked for prefunction interactions, the interpreter 400 proceeds to step 1516. In step 1516, the interpreter 400 executes the prefunction interactions appropriately. Step 1516 is described in greater detail below. After the interpreter 400 has processed all of the prefunction interactions, the interpreter continues to step 1520.

Referring again to step 1514, if the interpreter 400 determines that the Process_InteractionMethods function was not invoked for prefunction interactions, but was invoked for postfunction interactions, the interpreter 400 proceeds to step 1518. In step 1518, the interpreter 400 executes the postfunction interactions appropriately. Step 1518 is described in greater detail below. After the interpreter 400 has processed all of the postfunction interactions, the interpreter continues to step 1520.

In step 1520, the interpreter 400 determines whether a "do last" interaction method exists. If the interpreter 400 determines that a "do last" interaction method exists, the interpreter 400 proceeds to step 1522. In step 1522, the interpreter 400 loops through all "do last" interaction methods for the particular component. For each "do last," the interpreter 400 invokes the function Process_Action with the following parameters: the address of RC, the address of STACK, and the action for the "do last" interaction method. The function Process_Action returns a completion code that is assigned to the variable RC. After the interpreter 400 processes the "do last" interaction methods, the interpreter 400 continues to step 1524.

Referring again to step 1520, if the interpreter 400 determines that a "do last" interaction method does not exist, the interpreter 400 proceeds to step 1524.

In step 1524, the interpreter 400 has completed its processing of the function Process InteractionMethods and returns control along with the RC.

Figure 16:
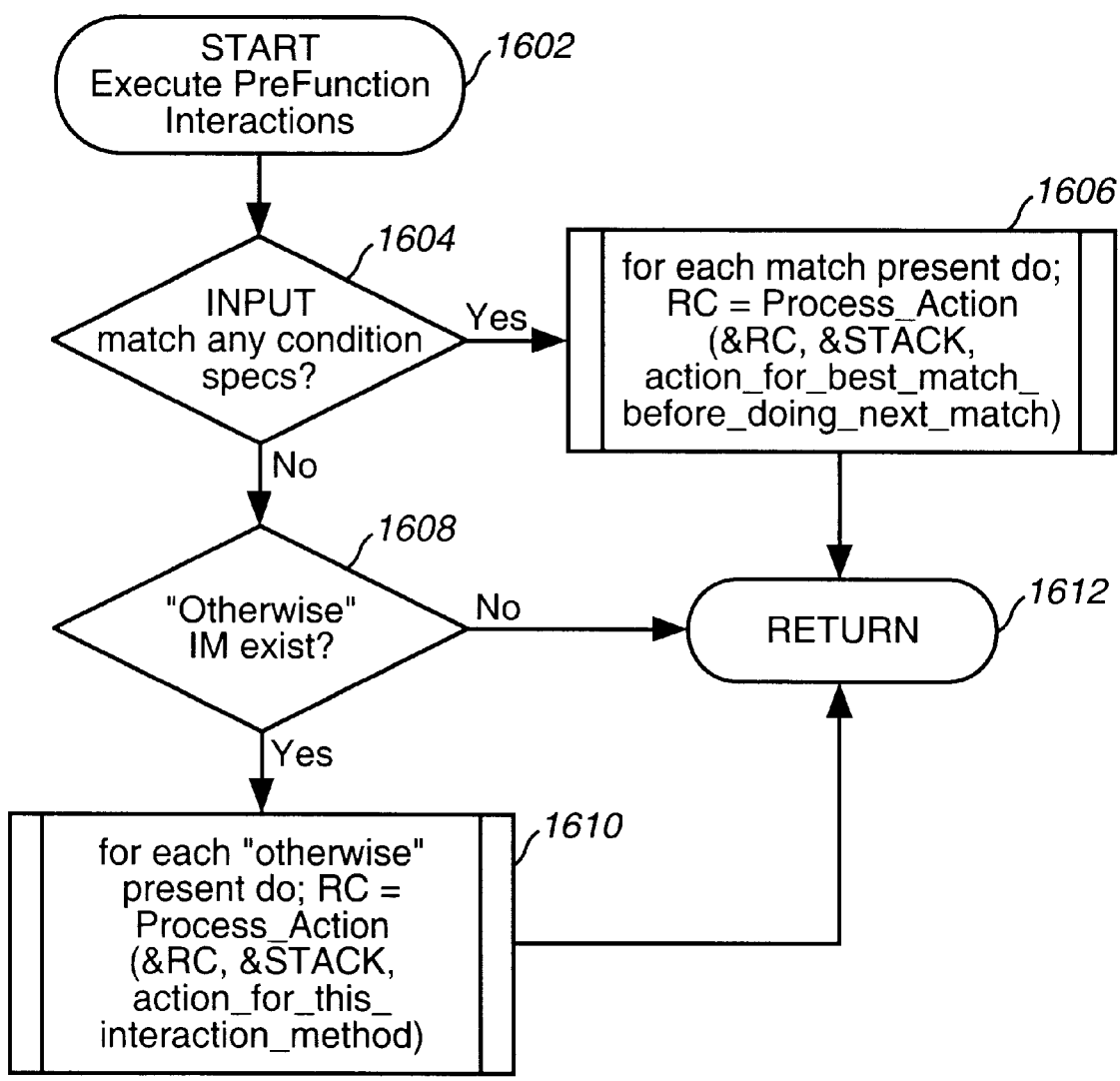
FIG. 16 is a control flow diagram illustrating the operation of processing Execute PreFunction Interactions.

FIG. 16 is a control flow diagram illustrating the operation of step 1516 and the process of executing prefunction interactions. Processing begins at step 1602 and immediately proceeds to step 1604. In step 1604, the interpreter 400 determines whether the value stored in the INPUT variable last caller/user entry matches any of the conditions specified in the list of interaction methods. If the INPUT variable matches any of the conditions, the interpreter 400 proceeds to step 1606. In step 1606, the interpreter 400 loops through all matched interaction methods in a priority order. For each match, the interpreter 400 invokes the function Process_Action with the following parameters: the address of RC, the address of STACK, and the action for the next best match interaction method. The function Process_Action returns a completion code that is assigned to the variable RC. After the interpreter 400 processes the applicable interaction methods, the interpreter 400 continues to step 1612. In step 1612, the interpreter 400 has completed the processing of step 1516 and returns control to FIG. 15.

Referring again to step 1604, if the interpreter 400 determines that the INPUT variable does not match any of the conditions specified in the list of interaction methods, the interpreter 400 proceeds to step 1608. In step 1608, the interpreter 400 determines whether an "otherwise" interaction method exits. If an "otherwise" interaction method exists, the interpreter 400 proceeds to step 1610. In step 1610, the interpreter 400 loops through all "otherwise" interaction methods. For each "otherwise," the interpreter 400 invokes the function Process_Action with the following parameters: the address of RC, the address of STACK, and the action for all "otherwise" interaction method. The function Process_Action returns a completion code that is assigned to the variable RC. After the interpreter 400 processes the "otherwise" interaction methods, the interpreter 400 continues to step 1612. In step 1612, the interpreter 400 has completed the processing of step 1516 and returns control to FIG. 15.

Referring again to step 1608, if the interpreter 400 determines that an "otherwise" interaction method does not exist, the interpreter 400 proceeds to step 1612. In step 1612, the interpreter 400 has completed the processing of step 1516 and returns control to FIG. 15.

Figure 17:
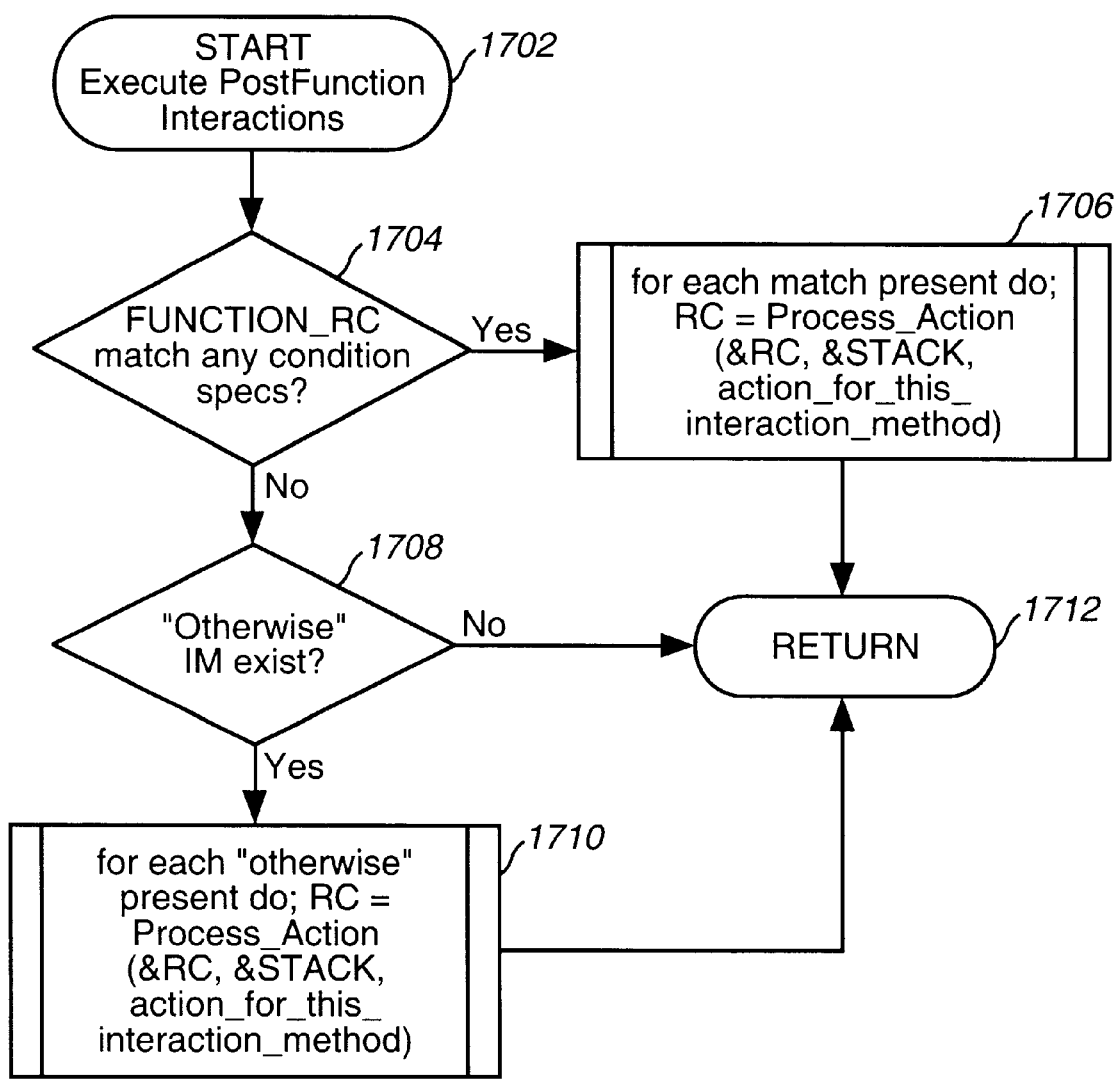
FIG. 17 is a control flow diagram illustrating the operation of processing Execute PostFunction Interactions.

FIG. 17 is a control flow diagram illustrating the operation of step 1518 and the process of executing postfunction interactions. Processing begins at step 1702 and immediately proceeds to step 1704. In step 1704, the interpreter 400 determines whether the value stored in the FUNCTION_RC variable, that was set in step 1504 of FIG. 15, matches any of the conditions specified in the list of postfunction interaction methods. If the FUNCTION_RC variable matches any of the conditions, the interpreter 400 proceeds to step 1706. In step 1706, the interpreter 400 loops through all matched interaction methods in an appropriate order. For each match, the interpreter 400 invokes the function Process_Action with the following parameters: the address of RC, the address of STACK, and the action for the matched interaction method. The function Process_Action returns a completion code that is assigned to the variable RC. After the interpreter 400 processes the applicable interaction methods, the interpreter 400 continues to step 1712. In step 1712, the interpreter 400 has completed the processing of step 1518 and returns control to FIG. 15.

Referring again to step 1704, if the interpreter 400 determines that the FUNCTION_RC variable does not match any of the conditions specified in the list of interaction methods, the interpreter 400 proceeds to step 1708. In step 1708, the interpreter 400 determines whether an "otherwise" interaction method exits. If an "otherwise" interaction method exists, the interpreter 400 proceeds to step 1710. In step 1710, the interpreter 400 loops through all "otherwise" interaction methods. For each "otherwise," the interpreter 400 invokes the function Process_Action with the following parameters: the address of RC, the address of STACK, and the action for the "otherwise" interaction method. The function Process_Action returns a completion code that is assigned to the variable RC. After the interpreter 400 processes the "otherwise" interaction methods, the interpreter 400 continues to step 1712. In step 1712, the interpreter 400 has completed the processing of step 1518 and returns control to FIG. 15.

Referring again to step 1708, if the interpreter 400 determines that an "otherwise" interaction method does not exist, the interpreter 400 proceeds to step 1712. In step 1712, the interpreter 400 has completed the processing of step 1518 and returns control to FIG. 15.

Figure 18:
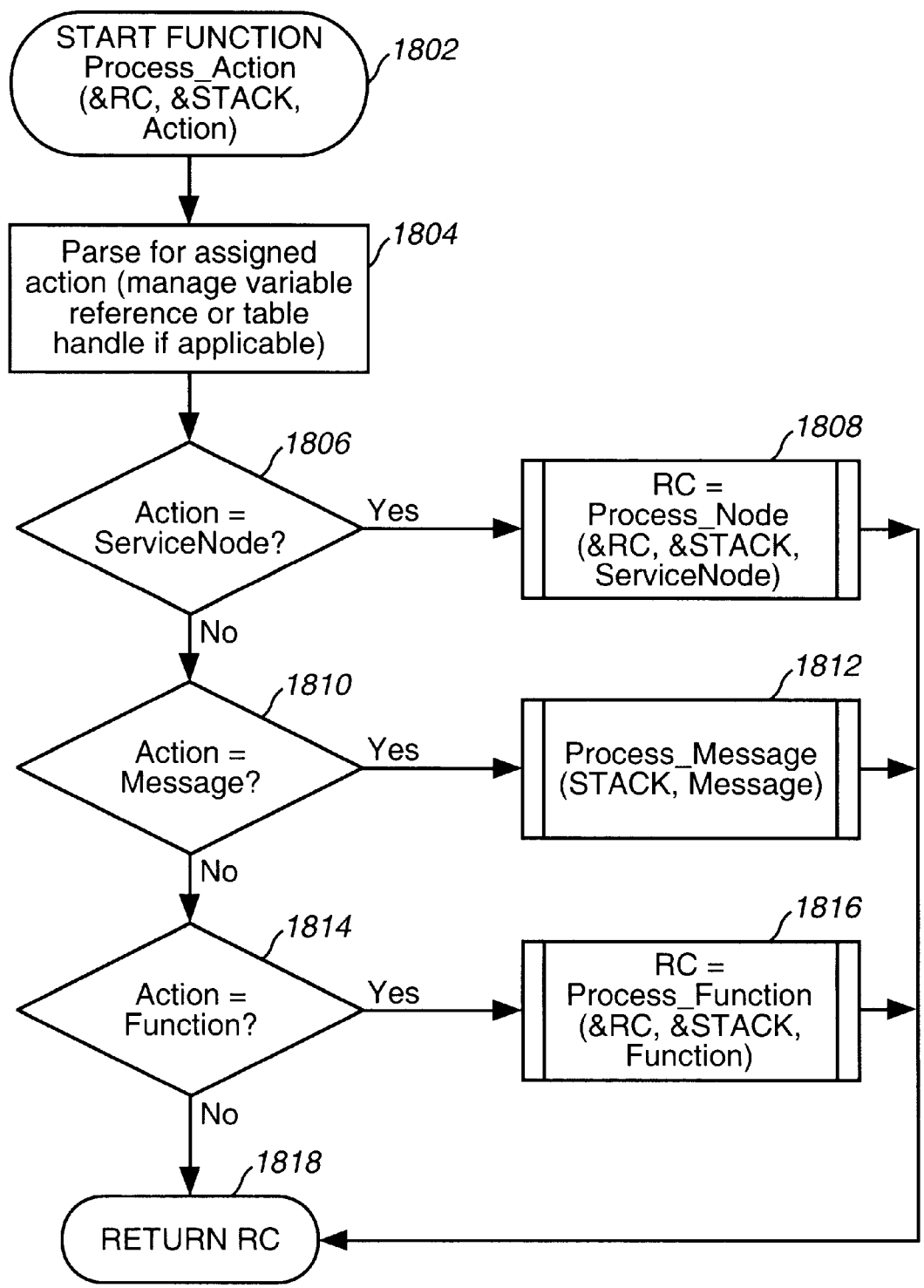
FIG. 18 is a control flow diagram illustrating the operation of processing the function Process_Action.

FIG. 18 is a control flow diagram illustrating certain operation of steps 1508, 1512, 1522, 1606, 1610, 1706, and 1710 in the processing of the function Process_Action. Processing begins at step 1802 and immediately proceeds to step 1804. In step 1804, the interpreter 400 parses the action that was input as a parameter. Variable references and table handles are handled appropriately. Continuing to step 1806, the interpreter 400 determines whether the action is an entire service node. If the action is an entire service node, the interpreter 400 proceeds to step 1808. In step 1808, the interpreter recursively invokes the function Process_Node with the following parameters: the address of RC, the address of STACK, and an appropriate pointer into the encoding for the service node. The function Process_Node is described in greater detail above. The function Process_Node returns a completion code which is assigned to the variable RC. After the interpreter 400 processes the service node action, the interpreter 400 continues to step 1818. In step 1818, the interpreter 400 has completed the processing of the action and returns control and the RC.

Referring again to step 1806, if the interpreter 400 determines that the action is not a service node, the interpreter 400 proceeds to step 1810. In step 1810, the interpreter 400 determines whether the action is a message object. If the action is a message object, the interpreter 400 proceeds to step 1812. In step 1812, the interpreter invokes the function Process_Message with the following parameters: the STACK, and the message object that is to be processed. The function Process_Message is described in greater detail above. After the interpreter 400 processes the message action, the interpreter 400 continues to step 1818. In step 1818, the interpreter 400 has completed the processing of the action and returns control and the RC.

Referring again to step 1810, if the interpreter 400 determines that the action is not a message, the interpreter 400 proceeds to step 1814. In step 1814, the interpreter 400 determines whether the action is a function. If the action is a function, the interpreter 400 proceeds to step 1816. In step 1816, the interpreter 400 invokes the function Process_Function with the following parameters: the address of RC, the address of STACK, and the function (or appropriate encoding pointer thereof) that is to be processed. The function Process_Function returns a completion code which is assigned to the variable RC and is described in greater detail below. After the interpreter 400 processes the function action, the interpreter 400 continues to step 1818. In step 1818, the interpreter 400 has completed the processing of the action and returns control and the RC.

Referring again to step 1814, if the interpreter 400 determines that the action is not a function, the interpreter 400 proceeds to step 1818. In step 1818, the interpreter 400 has completed the processing of the action and returns control and the RC.

Figure 19:
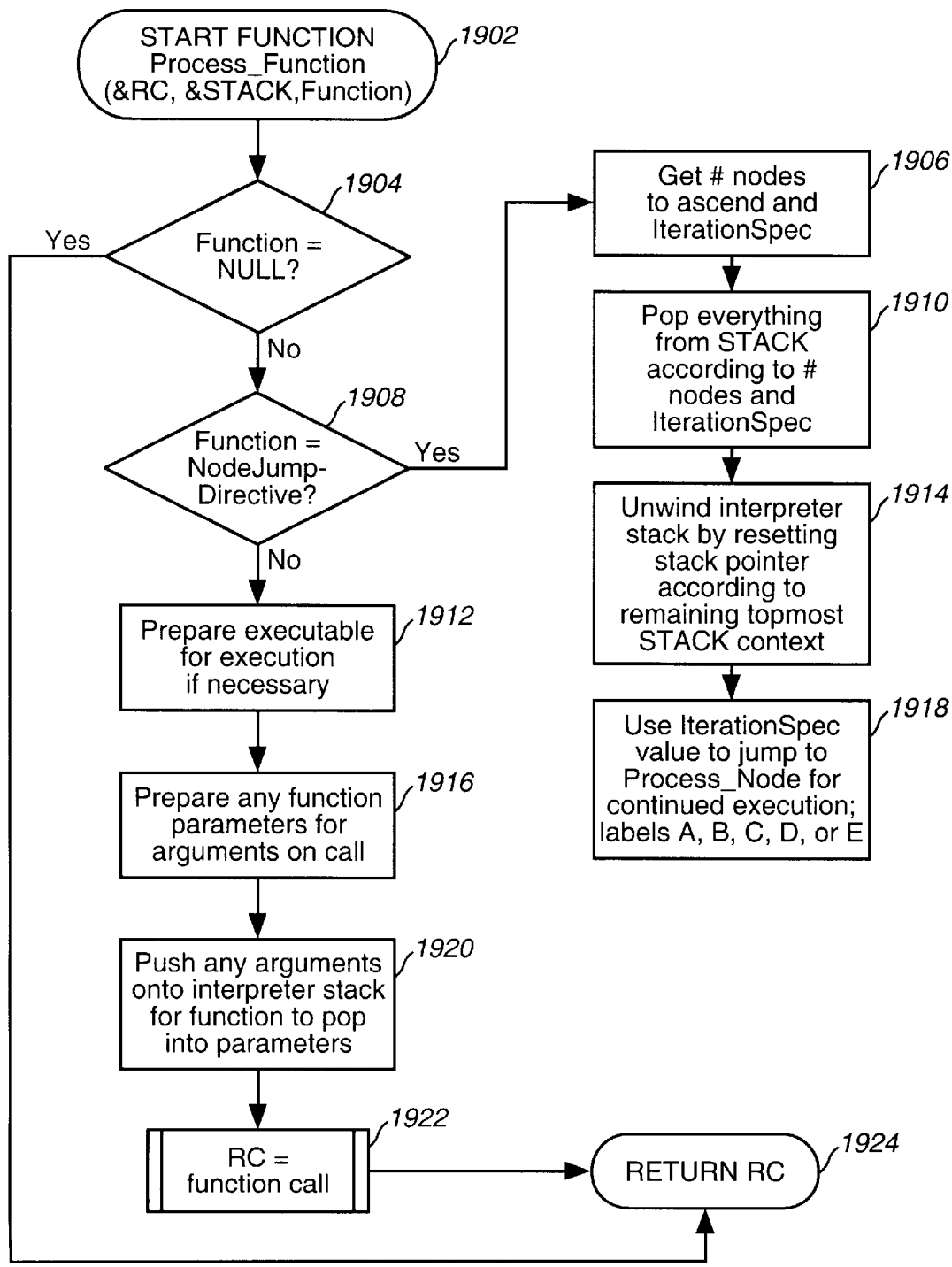
FIG. 19 is a control flow diagram illustrating the operation of processing the function Process_Function.

FIG. 19 is a control flow diagram illustrating the operation of step 1008 and 1816 and the processing of the function Process_Function. Processing begins at step 1902 and immediately proceeds to step 1904. In step 1904, the interpreter 400 determines whether the function operand is null. If the function is null, the interpreter 400 proceeds to step 1924. In step 1924, the interpreter 400 has completed its processing of the function and returns control and the RC.

Referring again to step 1904, if the interpreter 400 determines that the function is not null, the interpreter 400 proceeds to step 1908. In step 1908, the interpreter 400 determines whether the function is a node-jump directive. A node-jump directive tells the interpreter 400 to jump from the current service node being processed to a second service node in the ARU service offering 102. The node-jump directive is similar to a "goto" statement in conventional programming languages. The node-jump directive instructs the interpreter 400 to jump to any of the following components of a second service node: prefunction messaging 208, prefunction interactions 210, function 214, postfunction interactions 216, and postfunction messaging 218. If the interpreter 400 determines that the function is a node-jump directive, the interpreter 400 proceeds to step 1906.

In step 1906, the interpreter 400 gets the number of service nodes to ascend to and an iteration specification. The number of service nodes and iteration specification contain the needed information for instructing the interpreter 400 the location of the second service node to which to jump. Any integer greater than or equal to 0 is valid (0 implies iterate at component in current node). Continuing to step 1910, the interpreter 400 pops everything from the STACK variable according to the number of service nodes and iteration specification. More specifically, the interpreter 400 removes all of the context that it had pushed onto the STACK, resulting in the top of the STACK containing the context of the second service node, and component therein, to which the interpreter 400 is jumping. The interpreter 400 then continues to step 1914. In step 1914, the interpreter 400 unwinds the interpreter's stack by resetting interpreter's stack pointer according to the interpreter's stack pointer stored in the topmost STACK context. This step ensures that the interpreter's stack and the variable STACK are synchronized. Continuing to step 1918, the interpreter 400 uses the iteration specification to jump to the processing point of the second service node. More specifically, the interpreter 400 may jump to the following processing points of the second service node: label A 712 of the prefunction messaging 208 component, label B 920 of the prefunction interactions 210 component, label C 1012 of the function 214 component, label D 1114 of the postfunction interactions 216 component, and label E 1212 of the postfunction messaging 218 component. The node-jump directive results in an invocation of the Process_Node function. After the interpreter 400 completes the node-jump directive, the interpreter 400 continues execution therefrom.

Referring again to step 1908, if the interpreter 400 determines that the function is not a node-jump directive, the interpreter 400 proceeds to step 1912. In step 1912, the interpreter 400 appropriately prepares the assumed function for execution. This may include loading the function into executable memory from a variety of places. Continuing to step 1916, the interpreter 400 appropriately prepares any function parameters to be arguments for the call. Continuing to step 1920, the interpreter 400 pushes any arguments onto the interpreter stack which the function will pop off as parameters. After the interpreter 400 processes the function parameters, the interpreter 400 continues to step 1922. In step 1922, the interpreter 400 invokes the function. The function returns a completion code which is assigned to the variable RC. After the interpreter 400 processes the function, the interpreter 400 continues to step 1924. In step 1924, the interpreter 400 has completed the processing of the function and returns control and the RC.

Well known interpreter error handling has been omitted in order to focus on key invention aspects. Detection of invalid encoding syntax or semantics is assumed to immediately terminate interpreter processing with an error code (i.e., RC) indicating the error. The compiler embodiment may detect multiple errors before terminating.

4. Control flow of a preferred embodiment of a GUI tool

Figure 20:
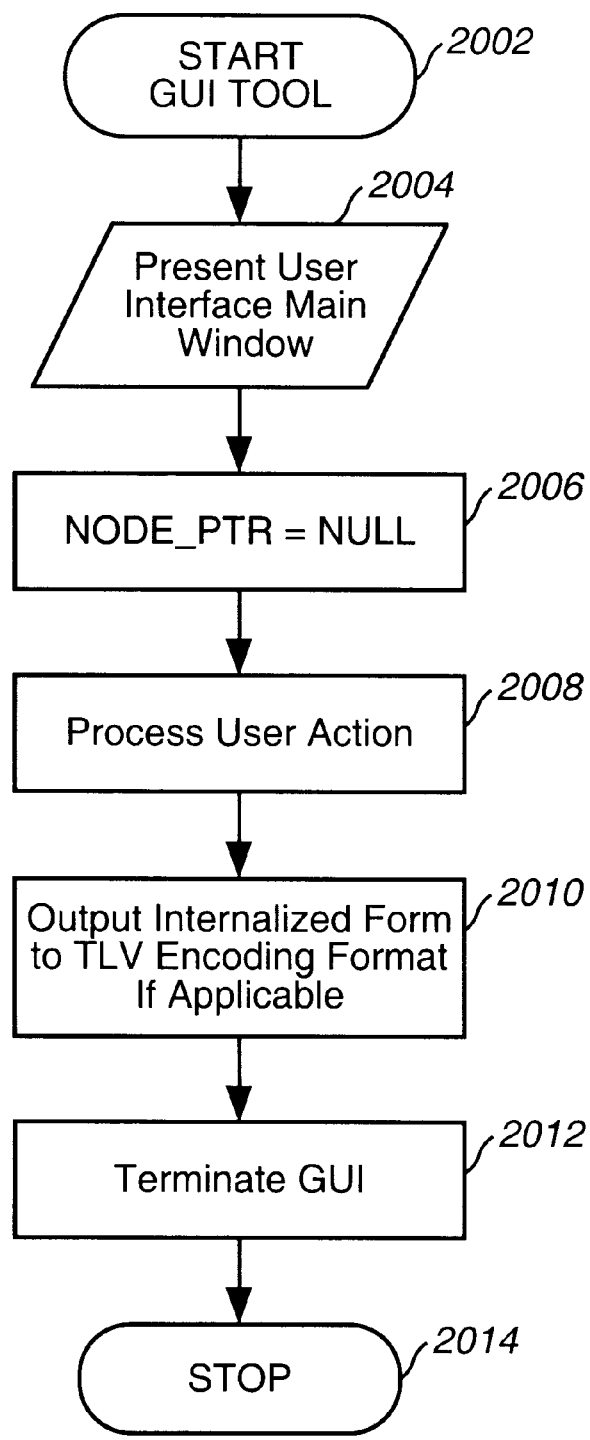
FIG. 20 is a control flow diagram illustrating the high-level operation of the preferred embodiment of a Graphical User Interface (GUI) tool.

FIG. 20 is a control flow diagram illustrating the high-level operation of a preferred embodiment of a graphical user interface (GUI) tool 2000. A developer of a ARU service uses the GUI to create and maintain an ARU service encoding. GUI tools are well known in the art. It would be readily apparent to one skilled in the relevant art to create the GUI tool 2000 described in FIGS. 20–25 and alternative embodiments thereof.

In operation, the GUI tool 2000 begins processing at step 2002 and immediately continues to step 2004. In step 2004, the GUI tool 2000 presents a user interface to the developer in a main window. Continuing to step 2006, the GUI tool 2000 initializes a variable NODE_PTR to a null value. The NODE_PTR is a pointer which will point to the tree structure of the ARU service offering 102 described above. Therefore, a null value for the NODE_PTR currently represents that there is no ARU service offering 102 currently being managed.

After setting NODE_PTR, the GUI tool 2000 continues to step 2008. In step 2008, the GUI tool 2000 processes the user action of creating or managing an ARU service offering 102. Step 2008 is described in greater detail below. Continuing to step 2010, the GUI tool 2000 outputs the internalized form of the tree structure to an ARU service encoding format. Step 2010 outputs a TLV encoding only if there is a file currently opened (i.e., ARU service offering was actively being managed by GUI tool 2000) as described by step 2144 below. The ARU service encoding format is described in greater detail in Appendix A. The internalized form is described in greater detail in Appendix B. NODE_PTR, which points to the root service node (actually points to SERVICE_OFFERING, structure of Appendix B, for example), is used to start step 2010 processing. Continuing to step 2012, the GUI tool 2000 terminates the user interface and continues to step 2014. In step 2014, all processing of the GUI tool 2000 has completed and the GUI tool 2000 stops.

Figure 21A:
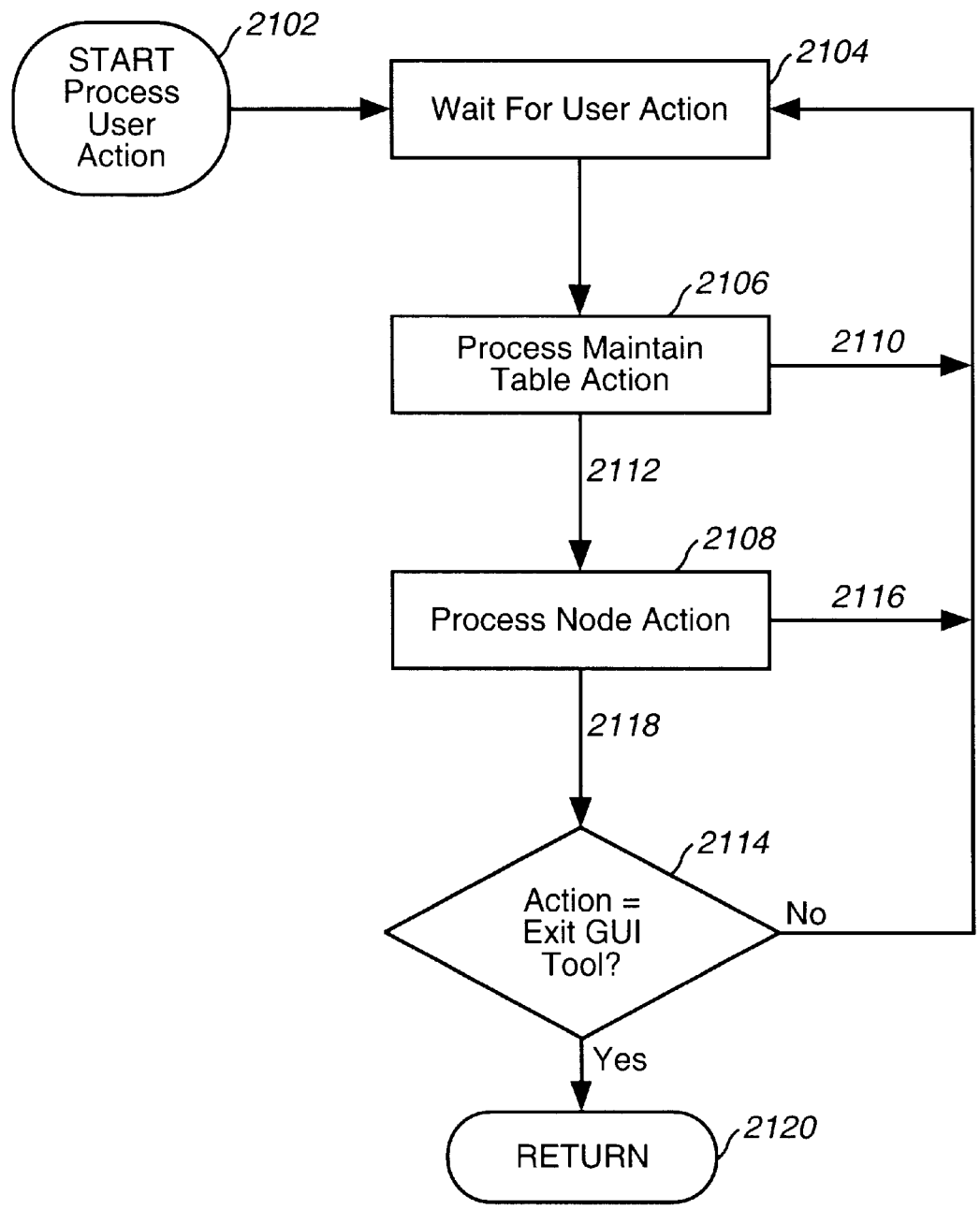
FIG. 21(A) is a control flow diagram illustrating the operation of processing a User Action.

FIG. 21(A) is a control flow diagram illustrating the operation of step 2008 and the processing of a user action. Processing begins at step 2102 and immediately proceeds to step 2104. In step 2104, the GUI tool 2000 waits for a user action; that is, it waits for the user to perform a user interface command or action. After receiving a user action, the GUI tool 2000 continues to step 2106. In step 2106, the GUI tool 2000 processes a maintain table action. In step 2106, the GUI tool 2000 determines whether the user action is a command for maintaining a specific table. If the user action is a command for maintaining a specific table, the GUI tool 2000 processes the user action and returns to step 2104 via control flow 2110 to wait for the next user action. Step 2104 is described in greater detail above. If, however, the user action is not a command for maintaining a specific table, the GUI tool 2000 proceeds to step 2108 via control flow 2112 to process a node action. Step 2106 is described in greater detail below.

Referring again to step 2108, the GUI tool 2000 determines whether the user action is a command for processing a node. If the user action is a command for processing a node, the GUI tool 2000 processes the user action and returns to step 2104 via control flow 2116 to wait for the next user action. Step 2104 is described in greater detail above. If, however, the user action is not a command for processing a node, the GUI tool 2000 proceeds to step 2114 via control flow 2118. In step 2114, the GUI tool 2000 determines whether the user action is to exit the GUI tool 2000. If the user action is to exit the GUI tool 2000, the GUI tool 2000 proceeds to step 2120. In step 2120, the GUI tool 2000 has completed its processing of step 2008 and returns control back to FIG. 20.

Referring again to step 2114, if the GUI tool 2000 determines that the user action is not the command for exiting the GUI tool 2000, the GUI tool 2000 returns to step 2104 to await further action. Step 2104 is described above.

Figure 21B:
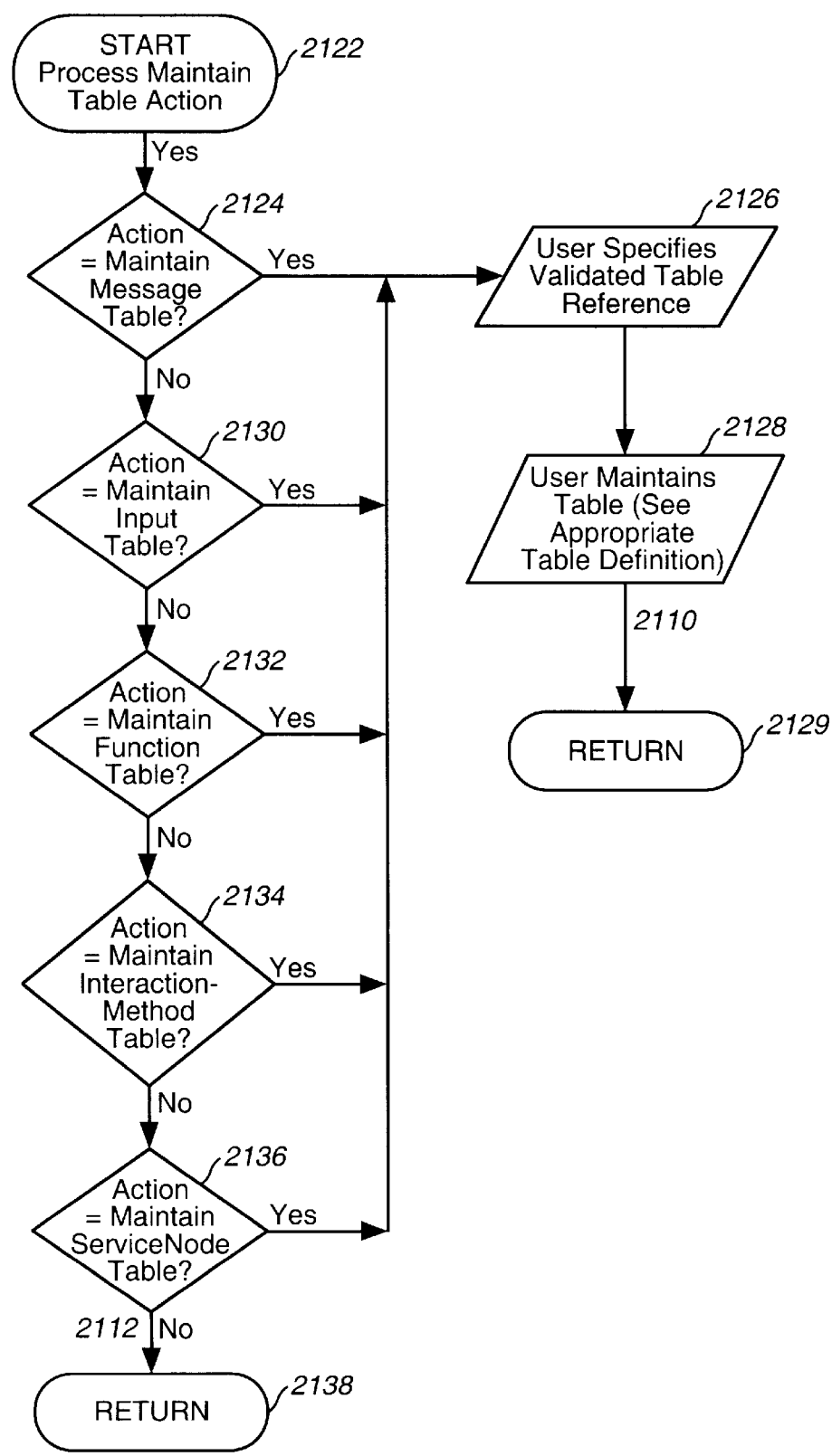
FIG. 21(B) is a control flow diagram illustrating the operation of processing a Maintain Table Action.

FIG. 21(B) is a control flow diagram illustrating the operation of step 2106 and the processing of a user action to maintain a specific table. Processing of step 2106 begins at step 2122 and immediately proceeds to step 2124. In step 2124, the GUI tool 2000 determines whether the user action is the command to maintain a message table. If the user action is the command to maintain a message table, the GUI tool 2000 proceeds to step 2126. In step 2126, the user specifies to the GUI tool 2000 a specific table reference which is validated before continuing to step 2128. Continuing to step 2128, the user maintains the specified table. More specifically, the user may create, delete, or modify the table that he specified in step 2126. It is readily apparent to one skilled in the relevant art to maintain a table via a graphical user interface. After the user maintains the specified table via the GUI tool 2000, processing continues to step 2129. In step 2129, the GUI tool 2000 has completed the processing of step 2106 and returns control to FIG. 21(A) via control flow 2110 thereby returning to step 2104.

Referring again to step 2124, if the GUI tool 2000 determines that the user action is not the command to maintain a message table, the GUI tool 2000 proceeds to step 2130. In step 2130, the GUI tool 2000 determines whether the user action is the command to maintain an input data table. If the user action is the command to maintain an input data table, the GUI tool 2000 proceeds to step 2126. Step 2126 is described in greater detail above. If the GUI tool 2000 determines that the user action is not the command to maintain an input data table, the GUI tool 2000 proceeds to step 2132.

In step 2132, the GUI tool 2000 determines whether the user action is the command to maintain a function table. If the user action is the command to maintain a function table, the GUI tool 2000 proceeds to step 2126. Step 2126 is described in greater detail above. If the GUI tool 2000 determines that the user action is not the command to maintain a function table, the GUI tool 2000 proceeds to step 2134.

In step 2134, the GUI tool 2000 determines whether the user action is the command to maintain an interaction method table. If the user action is the command to maintain an interaction method table, the GUI tool 2000 proceeds to step 2126. Step 2126 is described in greater detail above. If the GUI tool 2000 determines that the user action is not the command to maintain an interaction method table, the GUI tool 2000 proceeds to step 2136.

In step 2136, the GUI tool 2000 determines whether the user action is the command to maintain a service node table. If the user action is the command to maintain a service node table, the GUI tool 2000 proceeds to step 2126. Step 2126 is described in greater detail above. If the GUI tool 2000 determines that the user action is not the command to maintain a service node table, the GUI tool 2000 proceeds to step 2138. In step 2138, the GUI tool 2000 has completed the processing of step 2106 and returns control to FIG. 21(A) via control flow 2112 thereby proceeding to step 2108.

Therefore step 2106 handles any table maintenance activity. The message table, input table, function table, interaction method table, and service node table are described in greater detail above.

Figure 21C:
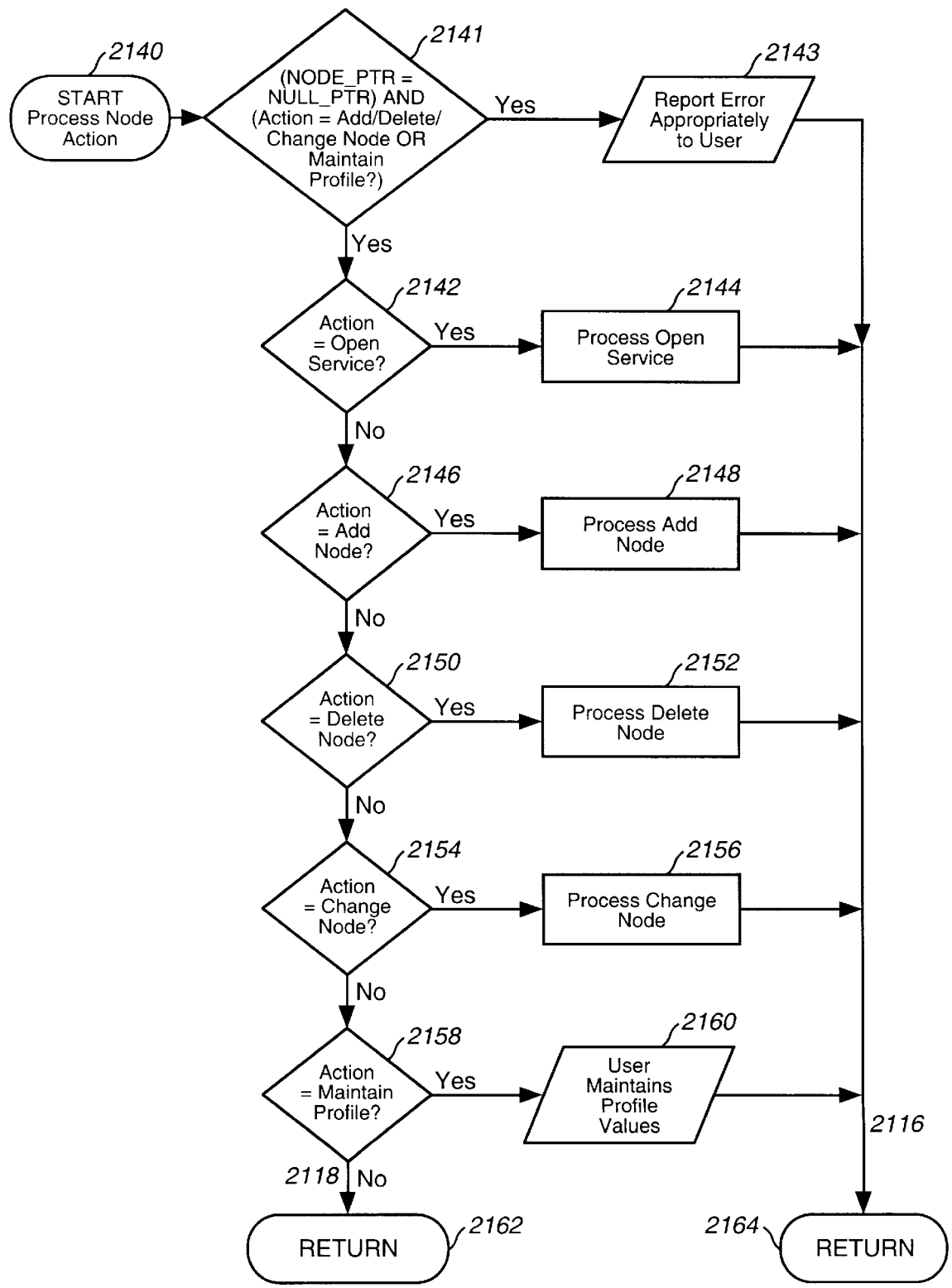
FIG. 21(C) is a control flow diagram illustrating the operation of processing a Node Action.

FIG. 21(C) is a control flow diagram illustrating the operation of step 2108 and the processing of a user action to process a node action. Processing of step 2108 begins at step 2140 and immediately proceeds to step 2141. In step 2141, the GUI tool 2000 determines if the user is performing a node action before properly opening an ARU service offering 102. If in step 2141, the variable NODE_PTR is still set to NULLPTR from step 2006 and the user has selected to perform any one of the following actions: add node, delete node, change node, maintain profile, then an error is reported to the user at step 2143. Step 2143 continues to step 2164 where the GUI tool 2000 has completed processing of step 2108 and control returns to FIG. 21(A) via control flow 2116 thereby returning to step 2104. If in step 2141, the user did not improperly request to perform a node action, then step 2141 continues to step 2142. In step 2142, the GUI tool 2000 determines whether the user action is the command to open a service. More specifically, the opening of a service is opening of a file containing an existing ARU service offering 102. This allows a user to read in and modify an existing ARU service offering 102. If the user action is the command to open a service, the GUI tool 2000 proceeds to step 2144. In step 2144, the GUI tool 2000 processes the opening of a service. Step 2144 is described in greater detail below. Continuing to step 2164, the GUI tool 2000 has completed the processing of step 2108 and returns control to FIG. 21(A) via control flow 2116 thereby returning to step 2104.

Referring again to step 2142, if the GUI tool 2000 determines that the user action is not the command to open an existing service offering 102, the GUI tool 2000 proceeds to step 2146. In step 2146, the GUI tool 2000 determines whether the user action is the command to add a node to the ARU service offering 102 currently being managed by the GUI tool 2000. If the user action is the command to add a node, the GUI tool 2000 proceeds to step 2148. In step 2148, the GUI tool 2000 processes the adding of a node to the ARU service offering 102 currently being managed by the GUI tool 2000. Step 2148 is described in greater detail below. Continuing to step 2164, the GUI tool 2000 has completed the processing of step 2108 and returns control to FIG. 21(A) via control flow 2116 thereby returning to step 2104. Referring again to step 2146, if the GUI tool 2000 determines that the user action is not the command to add a node, the GUI tool 2000 proceeds to step 2150.

In step 2150, the GUI tool 2000 determines whether the user action is the command to delete a node from the ARU service offering 102. If the user action is the command to delete a node, the GUI tool 2000 proceeds to step 2152. In step 2152, the GUI tool 2000 processes the deleting of a node from the ARU service offering 102 currently being managed by the GUI tool 2000. Step 2152 is described in greater detail below. Continuing to step 2164, the GUI tool 2000 has completed the processing of step 2108 and returns control to FIG. 21(A) via control flow 2116 thereby returning to step 2104. Referring again to step 2150, if the GUI tool 2000 determines that the user action is not the command to delete a node, the GUI tool 2000 proceeds to step 2154.

In step 2154, the GUI tool 2000 determines whether the user action is the command to change a node in the ARU service offering 102 currently being managed by the GUI tool 2000. If the user action is the command to change a node, the GUI tool 2000 proceeds to step 2156. In step 2156, the GUI tool 2000 processes the changing of a node in the ARU service offering 102. Step 2156 is described in greater detail below. Continuing to step 2164, the GUI tool 2000 has completed the processing of step 2108 and returns control to FIG. 21(A) via control flow 2116 thereby returning to step 2104. Referring again to step 2154, if the GUI tool 2000 determines that the user action is not the command to change a node, the GUI tool 2000 proceeds to step 2158.

In step 2158, the GUI tool 2000 determines whether the user action is the command to maintain a profile of the ARU service offering 102 currently being managed by the GUI tool 2000. If the user action is the command to maintain the service profile, the GUI tool 2000 proceeds to step 2160. In step 2160, the GUI tool 2000 processes the maintaining of the service profile of the ARU service offering 102. More specifically, the user may create, delete, or modify the service profile. It is readily apparent to one skilled in the relevant art to maintain a service profile via a graphical user interface. After the user maintains the profile via the GUI tool 2000, the GUI tool 2000 continues to step 2164. In step 2164, the GUI tool has completed its processing of step 2108 and returns control to FIG. 21(A) via control flow 2116 thereby returning to step 2104.

Referring again to step 2158, if the GUI tool 2000 determines that the user action is not the command to maintain a profile, the GUI tool 2000 proceeds to step 2162.

In step 2162, the GUI tool 2000 has completed the processing of step 2108 and returns control to FIG. 21(A) via control flow 2118 thereby continuing to step 2114.

Figure 22:
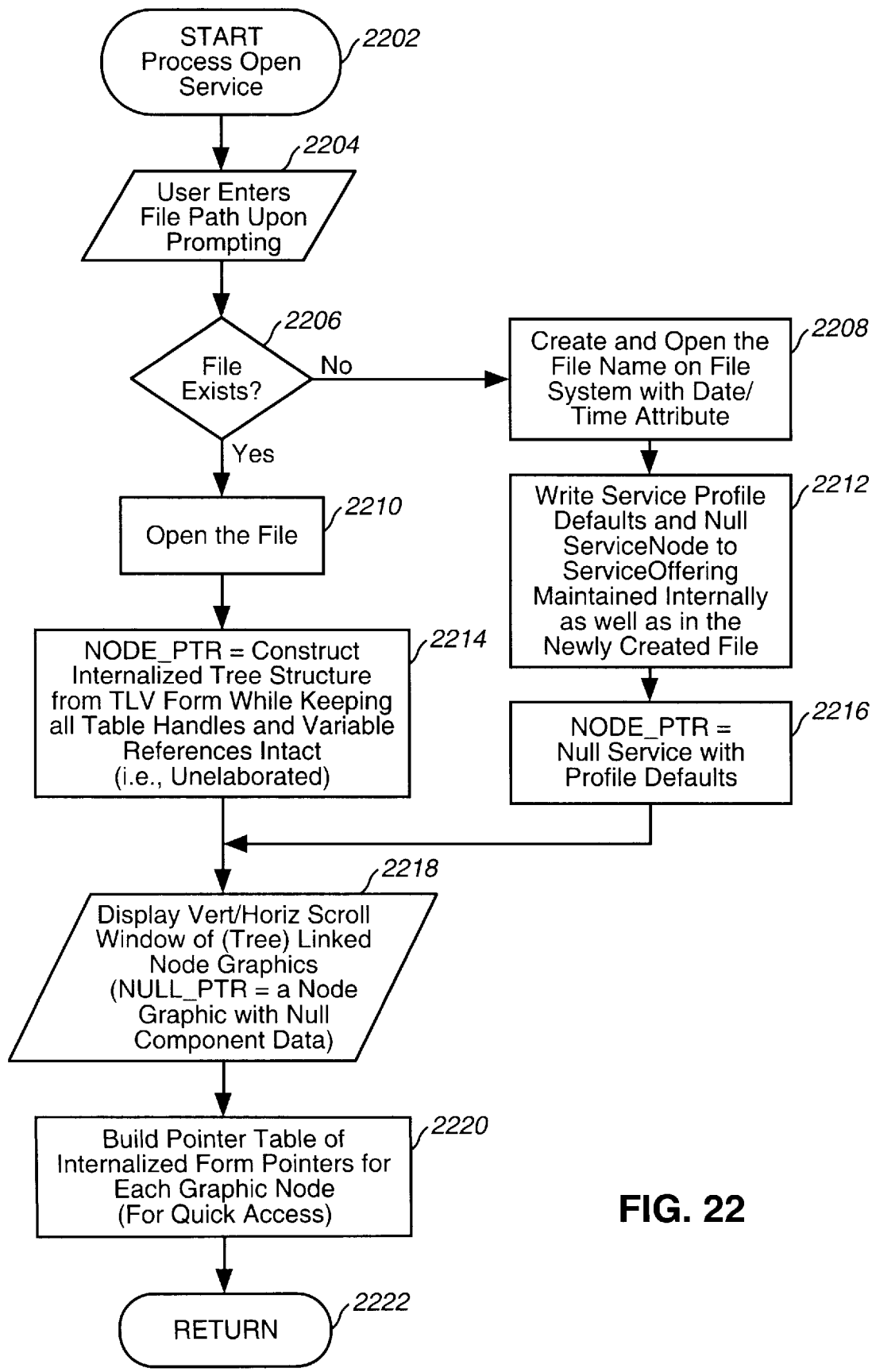
FIG. 22 is a control flow diagram illustrating the operation of processing an Open Service action.

FIG. 22 is a control flow diagram illustrating the operation of step 2144 and the processing of opening an existing ARU service offering 102 encoded in the TLV format of Appendix A. Processing begins at step 2202 and immediately proceeds to step 2204. In step 2204, the GUI tool 2000 prompts the user for a path name of the file containing the existing ARU service offering 102. Continuing to step 2206, the GUI tool 2000 determines whether the file specified by the user exists. If the file exists, the GUI tool 2000 proceeds to step 2210. Step 2206 determines the file does not exist if it is not in the appropriate format as well as if it is not present.

In step 2210, the GUI tool 2000 opens the file that the user specified in step 2204. Continuing to step 2214, the GUI tool 2000 creates an internalized form (Appendix B) of the ARU service offering 102 that is stored in the file (encoded in TLV format of Appendix A) and sets the NODE_PTR to point to the internalized form (SERVICE_OFFERING structure of Appendix B). The preferred embodiment of the ARU service offering 102 is stored in the file in an ARU service encoding form. It would be readily apparent to one skilled in the art to convert the ARU service encoding form specified in Appendix A to an internalized tree structure, for example that of Appendix B. Furthermore, the conversion to an internal tree structure retains all table handles and variable references; that is, the table handles and variable references are not elaborated by the GUI tool 2000. After the conversion, the GUI tool 2000 continues to step 2218. Step 2218 is described in greater detail below.

Referring again to step 2206, if the GUI tool 2000 determines that the file does not exist as described above, the GUI tool 2000 proceeds to step 2208. In step 2208, the GUI tool 2000 creates and opens a file with the path name that the user specified in step 2204. The GUI tool 2000 creates the file with the current date/time attribute. A special default file extension may be used to distinguish the file from other files. Continuing to step 2212, the GUI tool 2000 writes the service profile default values and null service node to the internal tree structure of the ARU service offering 102 and to the newly created file from step 2208. Continuing to step 2216, the GUI tool 2000 initializes NODE_PTR to a null service offering with profile defaults. The GUI tool 2000 then continues to step 2218.

In step 2218, the GUI tool 2000 displays the tree structure of the ARU service offering 102 to the user. More specifically, the GUI tool 2000 displays the tree structure in a window having both vertical and horizontal scroll bars which allow the user to traverse the tree structure. The tree structure of service nodes is displayed in an appropriate graphical manner. After the GUI tool 2000 displays the tree structure, the GUI tool 2000 continues to step 2220. In step 2220, the GUI tool 2000 builds a pointer table, each entry of which is a pointer to a service node of the internalized form of the tree structure. The GUI tool 2000 uses the pointer table for efficient access to the nodes of the tree structure when referenced on the window. Continuing to step 2222, the GUI tool 2000 has completed its processing of step 2144 and returns control to FIG. 21(C).

Figure 23:
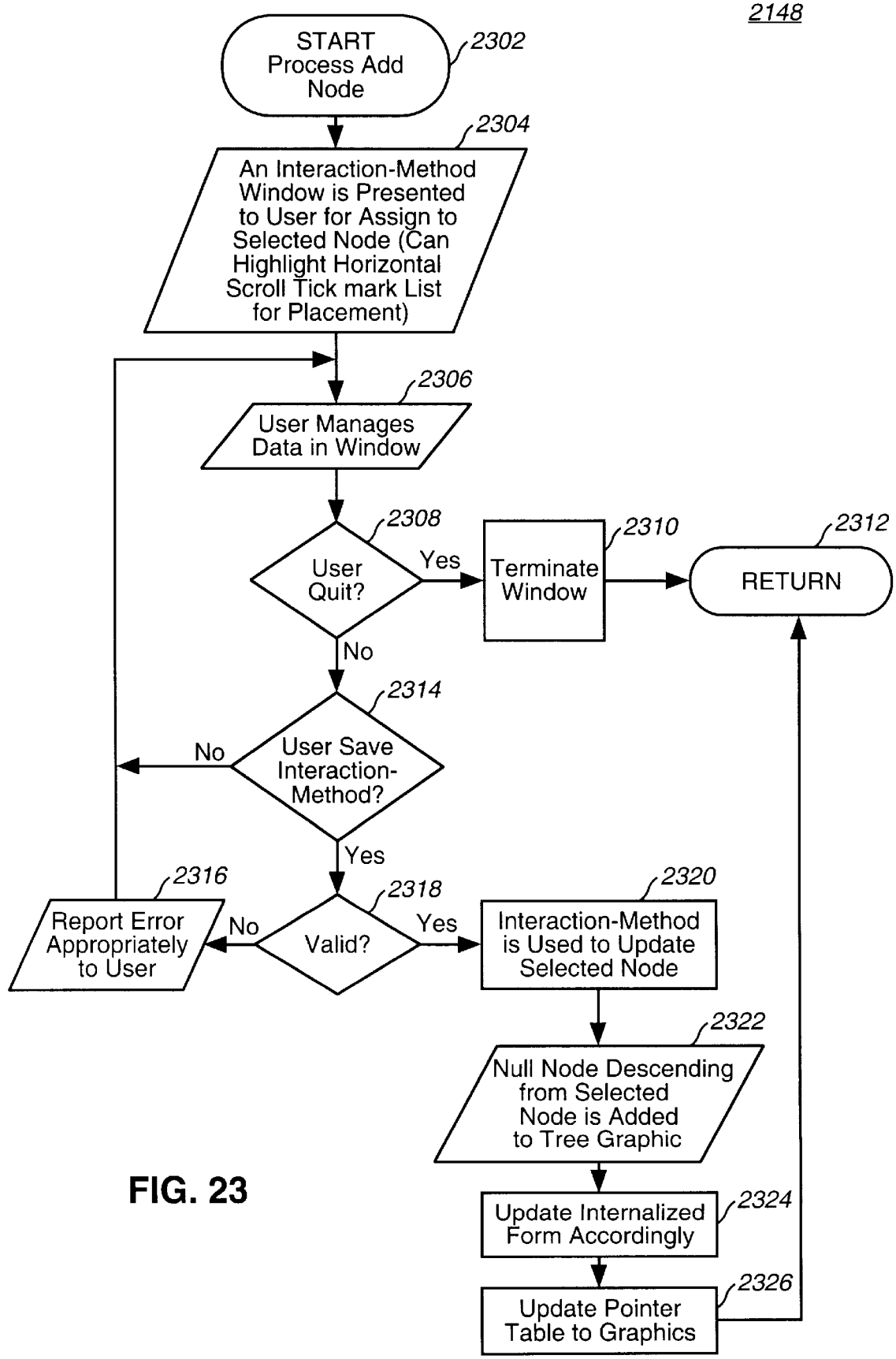
FIG. 23 is a control flow diagram illustrating the operation of processing an Add Node action.

FIG. 23 is a control flow diagram illustrating the operation of step 2148 and the process of adding a node (i.e., service node) to the tree structure of an ARU service offering 102. Processing begins at step 2302 and immediately proceeds to step 2304. In step 2304, the GUI tool 2000 presents an interaction method window to the user. The window enables adding a new node to the ARU service offering 102. The preferred embodiment of the interaction method window comprises the elements of an interaction method described above. It would be readily apparent to one skilled in the relevant art to implement such a window to the user. The interaction method maintained applies to the node which was selected at the time of performing the add node action.

The preferred embodiment of the present invention displays two horizontally scrollable lists of highlightable tick marks, each tick mark denoting a particular interaction method. One (the top most) scroll bar list of tick marks, which can each be highlighted, is for prefunction interactions. The other scroll bar list (bottom most) is for postfunction interactions. A tick mark can be highlighted prior to performing an add node action so that the new node is placed as an interaction method inserted at the position after the highlighted tick mark.

The GUI tool 2000 continues to step 2306. In step 2306, the user manages (e.g., edits) the data in the interaction method window that the GUI tool 2000 displayed in step 2304. After the user is finished managing the data, the GUI tool 2000 continues to step 2308. In step 2308, the GUI tool 2000 determines whether the user wants to quit the interaction method window. If the user wants to quit the window, the GUI tool 2000 proceeds to step 2310. In step 2310, the GUI tool 2000 terminates the interaction method window that it created in step 2304. Continuing to step 2312, the GUI tool 2000 has completed its processing of step 2148 and returns control to FIG. 21(C).

Referring again to step 2308, if the GUI tool 2000 determines that the user does not want to quit the interaction method window, the GUI tool 2000 proceeds to step 2314. In step 2314, the GUI tool 2000 determines whether the user wants to save the current interaction method data that he entered or edited in step 2306. If the user does not want to save the interaction method, the GUI tool 2000 returns to step 2306 which was described above. However, if the user wants to save the interaction method, the GUI tool 2000 proceeds to step 2318.

In step 2318, the GUI tool 2000 determines whether the data that the user entered for the interaction method in step 2306 is valid. If the GUI tool 2000 determines that the data is not valid, the GUI tool 2000 proceeds to step 2316. In step 2316, the GUI tool 2000 reports the appropriate errors to the user indicating which data of the interaction method is invalid. After reporting the errors, the GUI tool 2000 returns to step 2306, thereby allowing the user to reenter the interaction method data.

Referring again to step 2318, if the GUI tool 2000 determines that the data for the interaction method is valid, the GUI tool 2000 proceeds to step 2320. In step 2320, the GUI tool 2000 uses the data that the user entered for the current interaction method to update the selected node (according to the highlighted tick mark for placement) of the ARU service offering 102. Continuing to step 2322, the GUI tool 2000 adds a new null node to the tree structure graphic display of the ARU service offering 102, such that the new null node is a descendant of the selected node. After adding the new null node graphic, the GUI tool 2000 continues to step 2324 where the internal form of the ARU service offering 102 is updated to include the new node. The GUI tool 2000 then continues to step 2326. In step 2326, the GUI tool 2000 updates the pointer table to include the new null node that was just added to the ARU service offering 102. Continuing to step 2312, the GUI tool 2000 has completed its processing of step 2148 and returns control to FIG. 21(C).

Figure 24:
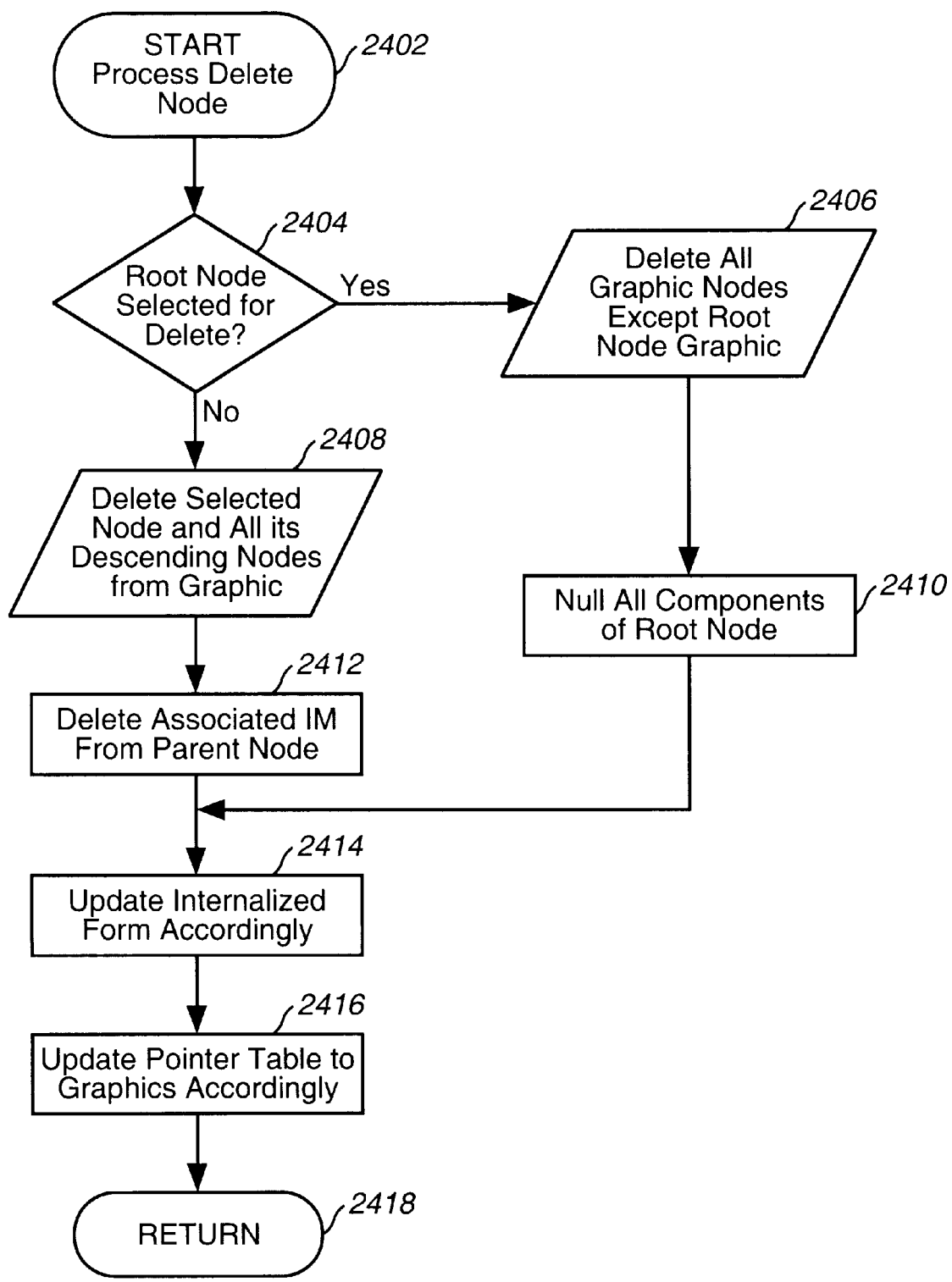
FIG. 24 is a control flow diagram illustrating the operation of processing a Delete Node action.

FIG. 24 is a control flow diagram illustrating the operation of step 2152 and the process of deleting a node from the tree structure of an ARU service offering 102. Processing begins at step 2402 and immediately proceeds to step 2404. In step 2404, the GUI tool 2000 determines whether the user selected the root node for deletion. If the user selected the root node, the GUI tool 2000 proceeds to step 2406. In step 2406, the GUI tool 2000 deletes all of the nodes descending from the root node from the graphic display. Continuing to step 2410, the GUI tool 2000 then enters a null value for each of the components 202 of the root node. The GUI tool 2000 then proceeds to step 2414 which is described in greater detail below.

Referring again to step 2404, if the GUI tool 2000 determines that the user did not select the root node for deletion, the GUI tool 2000 proceeds to step 2408. In step 2408, the GUI tool 2000 deletes the selected node and all of its descending nodes. Continuing to step 2412, the GUI tool 2000 then deletes the interaction method from the parent node that corresponds to the selected node. The GUI tool 2000 then continues to step 2414.

In step 2414, the GUI tool 2000 updates the internal form of the ARU service offering 102 to remove the applicable internal form structure. The GUI tool 2000 then continues to step 2416. In step 2416, the GUI tool 2000 also updates the pointer table to remove the pointers associated with the nodes removed from the internal form. Continuing to step 2418, the GUI tool 2000 has completed its processing of step 2152 and returns control to FIG. 21(C).

Figure 25:
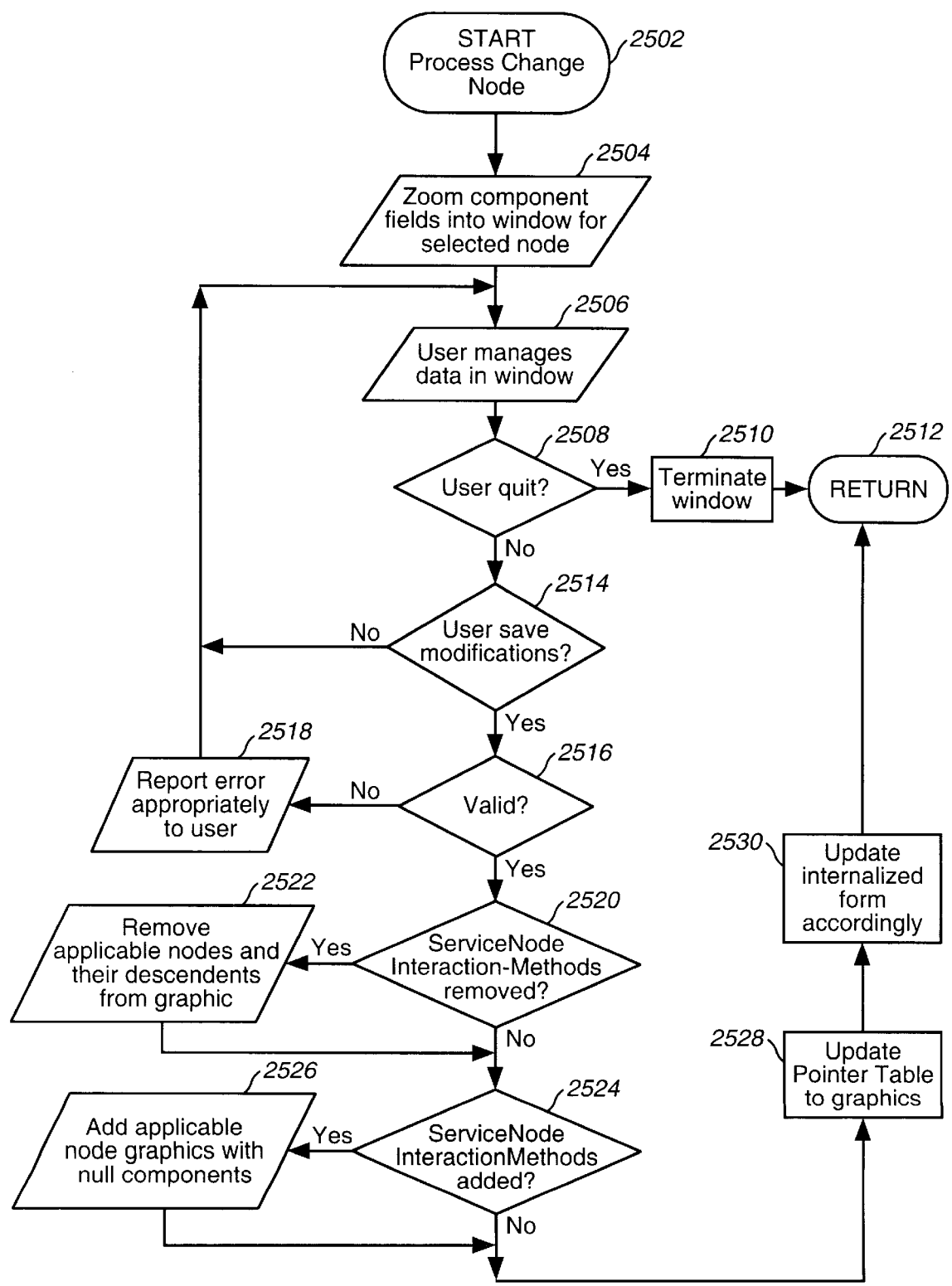
FIG. 25 is a control flow diagram illustrating the operation of processing a Change Node action.

FIG. 25 is a control flow diagram illustrating the operation of step 2156 and the process of changing the data of a node in the tree structure of an ARU service offering 102. Processing begins at step 2502 and immediately proceeds to step 2504. In step 2504, the GUI tool 2000 opens a component field window on the screen that contains the service node object 202 component fields for the selected node. Continuing to step 2506, the GUI tool 2000 allows the user to manage, or change, the data in the window. After the user is finished managing the data, the GUI tool 2000 continues to step 2508.

In step 2508, the GUI tool 2000 determines whether the use wants to quit the component field window. If the user wants to quit the window, the GUI tool 2000 proceeds to step 2510. In step 2510, the GUI tool 2000 terminates the component field window that it created in step 2504. Continuing to step 2512, the GUI tool 2000 has completed its processing of step 2156 and returns control to FIG. 21(C).

Referring again to step 2508, if the GUI tool 2000 determines that the user does not want to quit the component field window, the GUI tool 2000 proceeds to step 2514. In step 2514, the GUI tool 2000 determines whether the user wants to save the current modifications made to the component fields of the selected node. If the user does not want to save the modifications, the GUI tool 2000 returns to step 2506. However, if the user wants to save the modifications, the GUI tool 2000 proceeds to step 2516.

In step 2516, the GUI tool 2000 determines whether the data modifications that the user entered for the component fields in step 2506 is valid. If the GUI tool 2000 determines that the data is not valid, the GUI tool 2000 proceeds to step 2518. In step 2518, the GUI tool 2000 reports the appropriate errors to the user indicating which data of the component fields is invalid. After reporting the errors, the GUI tool 2000 returns to step 2506, thereby allowing the user to reenter modified data.

Referring again to step 2516, if the GUI tool 2000 determines that the data modifications for the component fields is valid, the GUI tool 2000 proceeds to step 2520. In step 2520, the GUI tool 2000 determines whether the user removed one or more interaction methods from the selected node. If the user did remove an interaction method, the GUI tool 2000 proceeds to step 2522. In step 2522, the GUI tool 2000 removes the service node(s) corresponding to the removed interaction method(s) from the tree structure graphic of the ARU service offering 102. The GUI tool 2000 then continues to step 2524 which is described in greater detail below.

Referring again to step 2520, if the GUI tool 2000 determines that the user did not remove one or more interaction methods from the selected node, the GUI tool 2000 proceeds to step 2524.

In step 2524, the GUI tool 2000 determines whether the user added one or more interaction methods to the selected node. If the user did add an interaction method, the GUI tool 2000 proceeds to step 2526. In step 2526, the GUI tool 2000 adds service node(s) corresponding to the new interaction method(s) to the tree structure graphic of the ARU service offering 102 with null component fields. The GUI tool 2000 then continues to step 2528 which is described below. Referring again to step 2524, if the GUI tool 2000 determines that the user did not add one or more interaction methods to the selected node, the GUI tool 2000 proceeds to step 2528.

In step 2528, the GUI tool 2000 updates the pointer table according to the modifications that the user made to the component fields of the selected node. The GUI tool 2000 then continues to step 2430. In step 2430, the GUI tool 2000 also updates the internal form of the ARU service offering 102 according to the user's modifications. Continuing to step 2512, the GUI tool 2000 has completed its processing of step 2156 and returns control to FIG. 21(C).

Conclusion

While various embodiments of the present invention have been described above, it should be understood that they have been presented by the way of example only, and not limitation. It should be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A method for performing an automatic response unit (ARU) service in response to a telephone call, comprising:

(a) parsing the ARU service encoding for a service node, said service node having service node components, said service node component including a node variables component, a prefunction messaging component, an automated input component, a prefunction interactions component, a function component, a postfunction interactions component, and a postfunction messaging component;

(b) processing said node variables component of said service node, said node variable component storing zero or more variable objects;

(c) processing said prefunction messaging component of said service node, said prefunction messaging component storing zero or more message objects that are played to a caller prior to processing said service node;

(d) processing said automated input component of said service node, said automated input component storing zero or more input data objects;

(e) processing said prefunction interactions component of said service node, said prefunction interaction component storing one or more prefunction actions, wherein each prefunction action is executed upon a satisfaction of a condition;

(f) processing said function component of said service node, said function component storing a function;

(g) processing said postfunction interactions component of said service node, said postfunction interaction component storing one or more postfunction actions, wherein each postfunction action is executed upon a satisfaction of a condition; and (h) processing said postfunction messaging component of said service node, said postfunction messaging component storing zero or more message objects that are played to said caller after processing said service node.

2. The method of claim 1, wherein step (d) comprises:

(1) parsing said automated input component for an input data object;

(2) determining if said input data object is null; and (3) setting a system variable to said input data object if it is determined in step (2) that said input data object is not null.

3. The method of claim 1, wherein step (e) comprises:

(1) determining if an "ignore others" condition exists for one or more said prefunction actions, resulting in one or more "ignore others" prefunction actions;

(2) executing said "ignore others" prefunction actions if it is determined in step (1) that said "ignore others" condition exists for one or more said prefunction actions;

(3) determining if a "do first" condition exists for one or more said prefunction actions, resulting in one or more "do first" prefunction actions;

(4) executing said "do first" prefunction actions if it is determined in step (3) that said "do first" condition exists for one or more said prefunction actions;

(5) determining a caller input;

(6) determining if said caller input matches one or more said conditions of said prefunction actions, resulting in one or more matched prefunction actions;

(7) executing said matched prefunction actions if it is determine in step (6) that said caller input matches one or more said conditions;

(8) determining if an "otherwise" condition exists for one or more said prefunction actions, resulting in one or more "otherwise" prefunction actions;

(9) executing said "otherwise" actions if it is determined in step (8) that said "otherwise" condition exists for one or more said prefunction actions;

(10) determining if a "do last" condition exists for one or more said prefunction actions, resulting in one or more "do last" prefunction actions; and

(11) executing said "do last" prefunction actions if it is determined in step (10) that said "do last" condition exists for one or more said prefunction actions.

4. The method of claim 1, wherein step (g) comprises:

(1) determining if an "ignore others" condition exists for one or more said postfunction actions, resulting in one or more "ignore others" postfunction actions;

(2) executing said "ignore others" actions if it is determined in step (1) that said "ignore others" condition exists for one or more said postfunction actions;

(3) determining if a "do first" condition exists for one or more said postfunction actions, resulting in one or more "do first" postfunction actions;

(4) executing said "do first" postfunction actions if it is determined in step (3) that said "do first" condition exists for one or more said postfunction actions;

(5) determining a return code from a last function;

(6) determining if said return code matches one or more said conditions of said actions, resulting in one or more matched postfunction actions;

(7) executing said matched postfunction actions if it is determine in step (6) that said return code matches one or more said conditions;

(8) determining if an "otherwise" condition exists for one or more said postfunction actions, resulting in one or more "otherwise" postfunction actions;

(9) executing said "otherwise" actions if it is determined in step (8) that said "otherwise" condition exists for one or more said postfunction actions;

(10) determining if a "do last" condition exists for one or more said postfunction actions, resulting in one or more "do last" postfunction actions; and

(11) executing said "do last" postfunction actions if it is determined in step (10) that said "do last" condition exists for one or more said postfunction actions.

5. The method of claim 1, wherein step (f) comprises:

(1) determining if said function component contains said function;

(2) determining if said function is a node-jump directive, if it is determined in step (1) that said function component contains a function;

(3) determining a service node component in a second service node to which to jump, if it is determined in step (2) that said function is said node-jump directive;

(4) jumping to said service node component in said second service node from said service node as determined in step (3); and (5) executing said function if is determined in step (2) that said function is not a node-jump directive.

6. A system for performing an automatic response unit (ARU) service in response to a telephone call, comprising:

parsing means for parsing the ARU service encoding for a service node, said service node having service node components, said service node component including a node variables component, a prefunction messaging component, an automated input component, prefunction interactions component, a function component, a postfunction interactions component, and a postfunction messaging component;

node variable means for processing said node variables component of said service node, said node variable component storing zero or more variable objects;

prefunction messaging means for processing said prefunction messaging component of said service node, said prefunction messaging component storing zero or more message objects that are played to a caller prior to processing said service node;

automated input means for processing said automated input component of said service node, said automated input component storing zero or more input data objects;

prefunction interaction means for processing said prefunction interactions component of said service node, said prefunction interaction component storing one or more interaction method objects, wherein each interaction method object is an action executed upon a satisfaction of a condition;

function means for processing said function component of said service node, said function component storing a function;

postfunction interaction means for processing said postfunction interactions component of said service node, said postfunction interaction component storing one or more interaction method objects, wherein each interaction method object is an action executed upon a satisfaction of a condition; and postfunction messaging means for processing said postfunction messaging component of said service node, said postfunction messaging component storing zero or more message objects that are played to said caller after processing said service node.

7. The system of claim 6, wherein said node variable object is an integer, real number, character string, generic data, input data object, message object, interaction method object, or service node object.

8. The system of claim 6, wherein said message object is a fully qualified path name of a recording file, text string, memory address of said recording file or said text string, variable reference, or message table entry handle.

9. The system of claim 6, wherein said input data object is a dual tone multi-frequency (DTMF) sequence, text string, fully qualified path name of a recording file, memory address of a DTMF sequence, memory address of a text string, memory address of a recording, variable reference, or input table entry handle.

10. The system of claim 6, wherein said function is a dynamic link library reference, fully qualified path name, memory address, node-jump directive, or function table entry handle.

11. The system of claim 6, wherein said interaction method object is a function, node-jump directive, message, or variable reference.

12. The system of claim 6, wherein said parsing means inputs the ARU service encoding from a remote location via a modem.

13. The system of claim 6, wherein said parsing means inputs the ARU service encoding at runtime.

14. A system for performing an ARU service in response to a telephone call, comprising:

(a) means for initiating processing of the telephone call by a root node of an ARU service encoding corresponding to the ARU service being performed wherein the root node is a top most node in a tree structure of an ARU service;

(b) means for receiving a selection of a function to be performed by the ARU service encoding entered by a user;

(c) means for proceeding to a descendant service node corresponding to the selection entered by a user; and (d) means for processing one or more components of the descendant service node, wherein each descendant service node includes a node variables component, a prefunction messaging component, an automated input component, a prefunction interactions component, a function component, a postfunction interactions component, and a postfunction messaging component.

* * * * *